United States Patent
Savaglio et al.

(10) Patent No.: US 9,414,438 B2
(45) Date of Patent: Aug. 9, 2016

(54) SYSTEM FOR CONVERTING BETWEEN HIGHER-LAYER PACKETS AND LOWER-LAYER PACKETS, A METHOD AND A BASE STATION SERVER THEREOF

(71) Applicant: CELLOS SOFTWARE LTD, Melbourne, VI (US)

(72) Inventors: Frank Peter Savaglio, Richmond (AU); Madhusudan Purushottamdas Pandya, Singapore (SI)

(73) Assignee: CellOS Software LTD, Melbourne (AU)

( * ) Notice: Subject to any disclaimer, the term of this patent is extended or adjusted under 35 U.S.C. 154(b) by 76 days.

(21) Appl. No.: 14/335,002

(22) Filed: Jul. 18, 2014

(65) Prior Publication Data
US 2015/0063373 A1   Mar. 5, 2015

Related U.S. Application Data

(60) Provisional application No. 61/873,130, filed on Sep. 3, 2013.

(51) Int. Cl.
*H04W 88/08* (2009.01)

(52) U.S. Cl.
CPC .................... *H04W 88/08* (2013.01)

(58) Field of Classification Search
CPC ............. H04W 88/08; H04W 36/0011; H04L 2212/00; H04L 61/2592
See application file for complete search history.

(56) References Cited

U.S. PATENT DOCUMENTS

| | | | |
|---|---|---|---|
| 2006/0153232 A1* | 7/2006 | Shvodian | H04W 28/065 370/468 |
| 2012/0147805 A1* | 6/2012 | Kim | H04B 7/155 370/312 |
| 2012/0307748 A1* | 12/2012 | Cheng | H04L 5/0005 370/329 |

* cited by examiner

*Primary Examiner* — Anh Ngoc Nguyen
(74) *Attorney, Agent, or Firm* — Duane Morris LLP

(57) ABSTRACT

The invention provides a system, method and base station server. According to an embodiment, a system for converting between higher-layer packets and lower-layer packets comprises a downlink base station server and an uplink base station client. The downlink base station server performs conversion of at least one downlink higher-layer packet to at least one downlink lower-layer packet by: receiving the at least one downlink higher-layer packet; converting the at least one downlink higher-layer packet to the at least one downlink lower-layer packet; and transmitting the at least one downlink lower-layer packet to a downlink base station client for transmission over a downlink channel to a downlink user device. The uplink base station client performs conversion of at least one uplink lower-layer packet to at least one uplink higher-layer packet and transmits the at least one uplink higher-layer packet to an uplink base station server.

22 Claims, 15 Drawing Sheets

SYSTEM FOR CONVERTING BETWEEN HIGHER-LAYER PACKETS AND LOWER-LAYER PACKETS, A METHOD AND A BASE STATION SERVER THEREOF

RELATED APPLICATION

The application claims the priority date of U.S. Provisional Patent Application No. 61/873,130 filed on 3 Sep. 2013, the disclosure of which is incorporated herein by reference.

FIELD OF INVENTION

The present invention is generally (but not exclusively) related to a system for converting between higher-layer packets and lower-layer packets, a method thereof and a base station server.

BACKGROUND

In contrast to a conventional Third Generation Project Partnership (3GPP) Universal Mobile Telecommunications System (UMTS) system where base stations (Node B) are connected to each other via Radio Network Controllers (RNC), the base stations (eNodeBs or eNBs) of a 3GPP Long Term Evolution (LTE) system may be connected to one another directly without a RNC. However, conventional eNodeBs conforming to the 3GPP LTE standard typically require significant upfront Capital Expenditure (CAPEX) (such as real estate costs for housing the Node B) and ongoing Operational Expenditure (OPEX) (such as energy costs for powering the Node B). Thus, there is a need for an improved or alternative system.

SUMMARY OF INVENTION

The present invention provides a system for converting between higher-layer packets and lower-layer packets, comprising:
a downlink base station server performs a conversion of at least one downlink higher-layer packet to at least one downlink lower-layer packet; and
an uplink base station client performs a conversion of at least one uplink lower-layer packet to at least one uplink higher-layer packet,
wherein the downlink base station server performs the conversion of the at least one downlink higher-layer packet to the at least one downlink lower-layer packet by:
receiving the at least one downlink higher-layer packet;
converting the at least one downlink higher-layer packet to the at least one downlink lower-layer packet; and
transmitting the at least one downlink lower-layer packet to a downlink base station client for transmission over a downlink channel to a downlink user device, and
wherein the uplink base station client performs the conversion of the at least one uplink lower-layer packet to the at least one uplink higher-layer packet by:
receiving the at least one uplink lower-layer packet over an uplink channel from an uplink user device;
converting the at least one uplink lower-layer packet to the at least one uplink higher-layer packet; and
transmitting the at least one uplink higher-layer packet to an uplink base station server.
In an embodiment, the downlink base station server is located at a first site, and the uplink base station client is located at a second site remote from the first site.

In an embodiment, the system further comprises the uplink base station server, wherein the downlink base station server and the uplink base station server are implemented in the same device.
In an embodiment, the system further comprises the downlink base station client, wherein the downlink base station client and the uplink base station client are implemented in the same device.
In an embodiment, the downlink channel is a downlink radio channel, and the uplink channel is an uplink radio channel.
In an embodiment, the downlink base station server is connected to a plurality of downlink base station clients.
In an embodiment, the downlink base station server is connected to each downlink base station client via a respective one of a plurality of downlink optical fibre links.
In an embodiment, the downlink base station server is connected to each downlink base station client via a respective one of a plurality of downlink Ethernet connections.
In an embodiment, the uplink base station client is connected to the uplink base station server via an uplink optical fibre link.
In an embodiment, the uplink base station client is connected to the uplink base station server via an uplink Ethernet connection.
In an embodiment, each downlink higher-layer packet is a Service Data Unit (SDU) that conforms to the Third Generation Partnership Project (3GPP) Long Term Evolution (LTE) standard, each uplink higher-layer packet is a SDU that conforms to the 3GPP LTE standard, each downlink lower-layer packet is a Packet Data Unit (PDU) that conforms to the 3GPP LTE standard, and each uplink lower-layer packet is a PDU that conforms to the 3GPP LTE standard.
In an embodiment, each downlink higher-layer packet corresponds to an Internet Protocol (IP) packet, and each uplink higher-layer packet corresponds to an IP packet.

The present invention also provides a method of converting between higher-layer packets and lower-layer packets, comprising:
performing a conversion of at least one downlink higher-layer packet to at least one downlink lower-layer packet at a downlink base station server; and
performing a conversion of at least one uplink lower-layer packet to at least one uplink higher-layer packet at an uplink base station client,
wherein performing the conversion of the at least one downlink higher-layer packet to the at least one downlink lower-layer packet at the downlink base station server comprises:
receiving the at least one downlink higher-layer packet;
converting the at least one downlink higher-layer packet to the at least one downlink lower-layer packet; and
transmitting the at least one downlink lower-layer packet to a downlink base station client for transmission over a downlink channel to a downlink user device, and
wherein performing the conversion of the at least one uplink lower-layer packet to the at least one uplink higher-layer packet at the uplink base station client comprises:
receiving the at least one uplink lower-layer over an uplink channel from an uplink user device;
converting the at least one uplink lower-layer to the at least one uplink higher-layer packet; and
transmitting the at least one uplink higher-layer packet to an uplink base station server.
In an embodiment, converting the at least one downlink higher-layer packet to the at least one downlink lower-layer packet comprises segmenting the at least one downlink higher-layer packet into a plurality of downlink lower-layer packets according to a Radio Link Control (RLC) protocol.

In an embodiment, converting the at least one downlink higher-layer packet to the at least one downlink lower-layer packet comprises concatenating a plurality of downlink higher-layer packets into the at least one downlink lower-layer packet according to a Radio Link Control (RLC) protocol.

In an embodiment, converting the at least one downlink higher-layer packet to the at least one downlink lower-layer packet comprises reassembling the at least one downlink higher-layer packet as the at least one downlink lower-layer packet according to a Radio Link Control (RLC) protocol.

In an embodiment, the Radio Link Control (RLC) protocol conforms to the Third Generation Partnership Project (3GPP) Long Term Evolution (LTE) standard.

The present invention also provides a base station server comprising:

at least one downlink packet transmitter, each downlink packet transmitter that:
  receives at least one downlink higher-layer packet;
  converts the at least one downlink higher-layer packet to at least one downlink lower-layer packet; and
  transmits the at least one downlink lower-layer packet to a downlink base station client for transmission over a downlink channel to a downlink user device; and at least one uplink packet receiver, each uplink packet receiver that:
  receives from an uplink base station client at least one uplink higher-layer packet converted by the uplink base station client from at least one uplink lower-layer packet received by the uplink base station client over an uplink channel from an uplink user device; and
  processes the at least one uplink higher-layer packet.

In an embodiment, the base station server comprises a plurality of uplink packet receivers, each uplink packet receiver being associated with a respective one of the plurality of uplink base station clients.

In an embodiment, the base station server comprises a plurality of downlink packet transmitters, each downlink packet transmitter being associated with a respective one of the plurality of downlink base station clients.

In an embodiment, the uplink packet receiver processes the at least one uplink higher-layer packet, by transmitting the at least one higher-layer packet to another one of the at least one downlink packet transmitter.

In an embodiment, the uplink packet receiver processes the at least one uplink higher-layer packet, by transmitting the at least one higher-layer packet to another base station server.

The present invention also provides a system for de-compressing packets, comprising:

a base station client performs a de-compression of a packet comprising a header and a payload; and a base station server further processes the de-compressed packet, wherein the base station client performs the de-compression of the packet by:
  receiving the packet over a channel from a user device;
  de-compressing the header of the packet; and
  transmitting the de-compressed header and the payload of the packet as the de-compressed packet to the base station server for further processing.

In an embodiment, the base station server is located at a first site, and the base station client is located at a second site remote from the first site.

In an embodiment, the channel is an uplink radio channel.

In an embodiment, the dez-compressed header is a header of an Internet Protocol (IP) packet.

In an embodiment, the header is a header of a Service Data Unit (SDU) that conforms to the Third Generation Partnership Project (3GPP) Long Term Evolution (LTE) standard.

In an embodiment, the system further comprises a plurality of base station clients, and wherein the base station server receives a de-compressed packet from each base station client.

In an embodiment, the base station server is connected to each base station client via a respective one of a plurality of optical fibre links.

In an embodiment, the base station server is connected to each base station client via a respective one of a plurality of Ethernet connections.

The present invention also provides a method of de-compressing packets, comprising:

performing at a base station client a de-compression of a packet comprising a header and a payload; and further processing the de-compressed packet at a base station server, wherein performing the de-compression of the packet at the base station client comprises:
  receiving the packet over a channel from a user device;
  de-compressing the header of the packet; and
  transmitting the de-compressed header and the payload of the packet as the de-compressed packet to the base station server for further processing.

In an embodiment, the header is de-compressed according to a Packet Data Convergence Protocol (PDCP).

In an embodiment, the Packet Data Convergence Protocol (PDCP) conforms to the Third Generation Partnership Project (3GPP) Long Term Evolution (LTE) standard.

The present invention also provides a base station server comprising:

at least one packet receiver, each packet receiver that:
  receives from a base station client a packet de-compressed by the base station client from a compressed packet received by the base station client over a channel from a user device; and
  further processes the packet,
  wherein the compressed packet comprises a compressed header and a payload, and the packet comprises a header de-compressed from the header of the compressed packet and the payload of the compressed packet.

In an embodiment, the base station server comprises a plurality of packet receivers, each packet receiver being associated with a respective one of a plurality of base station clients.

In an embodiment, each packet receiver further processes the packet, by transmitting the packet to another base station server.

In an embodiment, the base station server further comprises at least one downlink packet transmitter, each downlink packet transmitter that:
  receives a downlink packet comprising a header and a downlink payload;
  compresses the header of the downlink packet; and
  transmits the compressed header and the downlink payload of the downlink packet as the compressed downlink packet to a downlink base station client for transmission over a downlink channel to a downlink user device.

BRIEF DESCRIPTION OF DRAWINGS

In order that the invention may be more clearly ascertained, embodiments of the invention will be described, by way of example, with reference to the accompanying drawings in which.

DETAILED DESCRIPTION

Referring to the accompanying drawings, there is described a system 1, 5, 111 for converting between higher-layer packets and lower-layer packets, for example, between Radio Link Control (RLC) Service Data Units (SDUs) and RLC Packet Data Units (PDUs) of the 3GPP LTE standard. The system 1, 5, 111 comprises a base station client 11a, 12a, 13a, 115 that receives uplink lower-layer packets from an uplink user device such as an uplink User Equipment (UE) (that is, a UE making uplink transmissions) conforming to the 3GPP LTE standard. The system 1, 5, 111 also comprises a base station server 10 that receives downlink high-layer packets for transmission to a downlink user device such as a downlink UE (that is, a UE making downlink transmissions). The base station server 10 is performs a conversion of at least one downlink higher-layer packet to at least one downlink lower-layer packet, and the base station client 11a, 12a, 13a, 115 is performs a conversion of at least one uplink lower-layer packet to at least one uplink higher-layer packet. Thus, the system 1, 5, 111 is advantageous in that downlink packet conversions for multiple downlink UEs can be cost-effectively centralized at the base station server 10 without compromising the performance (for example, delay or latency performance) of the system 1, 5, 111 to perform uplink packet conversions for uplink UEs.

Persons skilled in the art will appreciate that the term "uplink" refers to the flow of data/packets from a UE to an eNodeB, and the term "downlink" refers to the flow of data/packets from an eNodeB to a UE.

Radio Protocol Architecture

The radio protocol architecture of the 3GPP LTE standard may be separated into a user plane architecture (the user plane) and a control plane architecture (the control plane). The user plane specifies radio protocol layers (and radio protocol sub-layers) in respect of user data (or user traffic). The control plane specifies radio protocol layers (and radio protocol sub-layers) in respect of control/signalling information. The radio protocol layers (and radio protocol sub-layers) of the user plane architecture and the control plane architecture include:

Layer 1 (L1 layer)
    Physical (PHY) sub-layer
Layer 2 (L2 layer)
    Medium Access Control (MAC) sub-layer
    Radio Link Control (RLC) sub-layer
    Packet Data Convergence Protocol (PDCP) sub-layer
Layer 3 (L3 layer)
    a Radio Resource Control (RRC) sub-layer The operations that may be performed at the layers (and sub-layers) of the user plane and the control plane are specified in the 3GPP LTE standard. For example, many of the operations performed by an eNodeB at the layers (sub-layers) of the L2 layer may be found in Technical Specification 36.300 of the 3GPP LTE standard.

General Construction of the System

Figure 1:
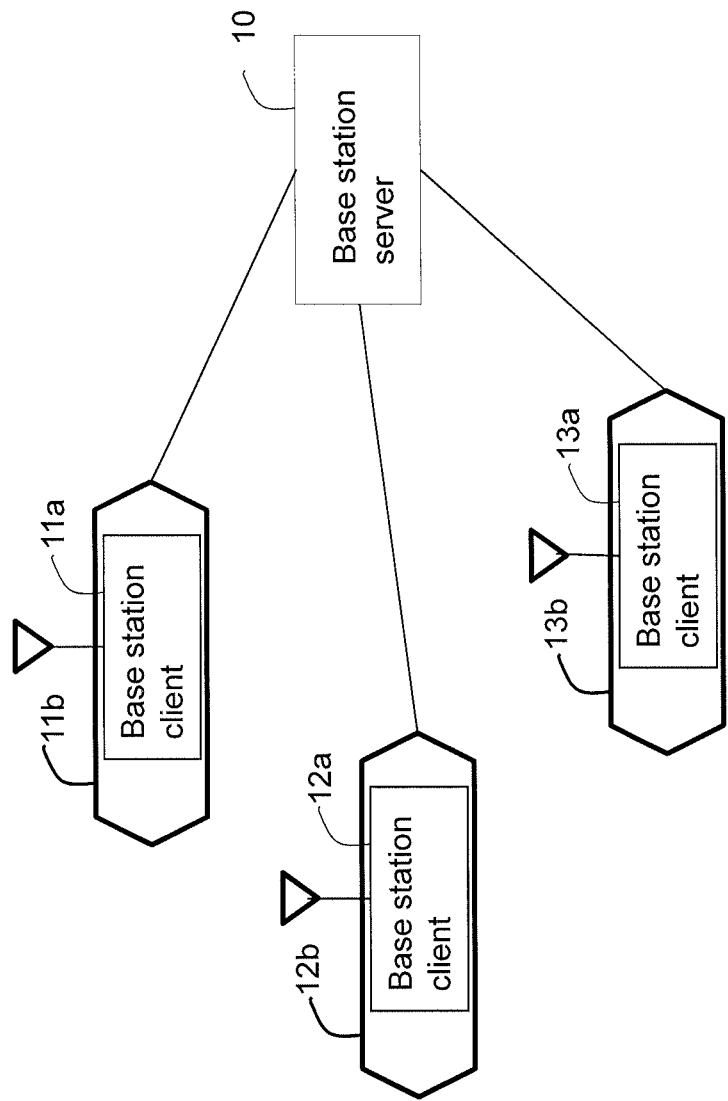
FIG. 1 is a schematic diagram of an embodiment of the system comprising a base station server and a plurality of base station clients.

FIG. 1 is a schematic diagram of an embodiment of the system 1. The system 1 conforms to the 3GPP LTE standard, and is based on a Cloud-Random Access Network (C-RAN) arrangement where baseband processing conventionally performed by a conventional eNodeB is split/distributed between a base station server 10 (also referred to as a base station hotel) and a base station client 11a, 12a, 13a (also referred to as cell site equipment or a Remote Radio Head Unit (RHU)).

The system 1 comprises a base station server 10 and three base station clients 11a, 12a, 13a. Persons skilled in the art will appreciate that the system 1 may include more than one base station server 10 and/or one, two or more than three base station clients 11a, 12a, 13a.

Each base station client 11a, 12a, 13a is located at a respective one of a plurality of cell sites (or antenna towers) 11b, 12b, 13b located remotely from the location of the base station server 10, and is connected to the base station server 10 such that one or more packets (for example, one or more RLC SDUs received from a UE) may be transmitted from the base station client 11a, 12a, 13a to another base station client 11a, 12a, 13a via the base station server 10. Each base station client 11a, 12a, 13a is connected to the base station server 10 via an optical fibre link. Persons skilled in the art will appreciate that one or more of the base station clients 11a, 12a, 13a may alternatively be connected to the base station server 10 via a different type of link such as a high-speed wireless link.

It is envisaged that the base station server 10 may be connected to other base station servers or conventional eNodeBs such that one or more packets (for example, one or more RLC SDUs received from a base station client 11a, 12a, 13a) may be transmitted from the base station server 10 to another base station server or conventional eNodeB. The base station server 10 may be connected to other base station servers or conventional eNodeBs via a core network (such as an Evolved Packet Core (EPC)), and that the base station server 10 may be connected to the core network via a connection point (such as a General Packet Radio Service (GPRS) Tunnelling Protocol-User plane (GTP-U) Tunnel end point) at the core network. Also, it is envisaged that the system 1 may support multiple bands and be scaled by increasing the number of base station clients 11a, 12a, 13a and the capacity of the base station server 10, for example, by increasing the number of baseband processing units implemented by the base station server 10.

Figure 2:
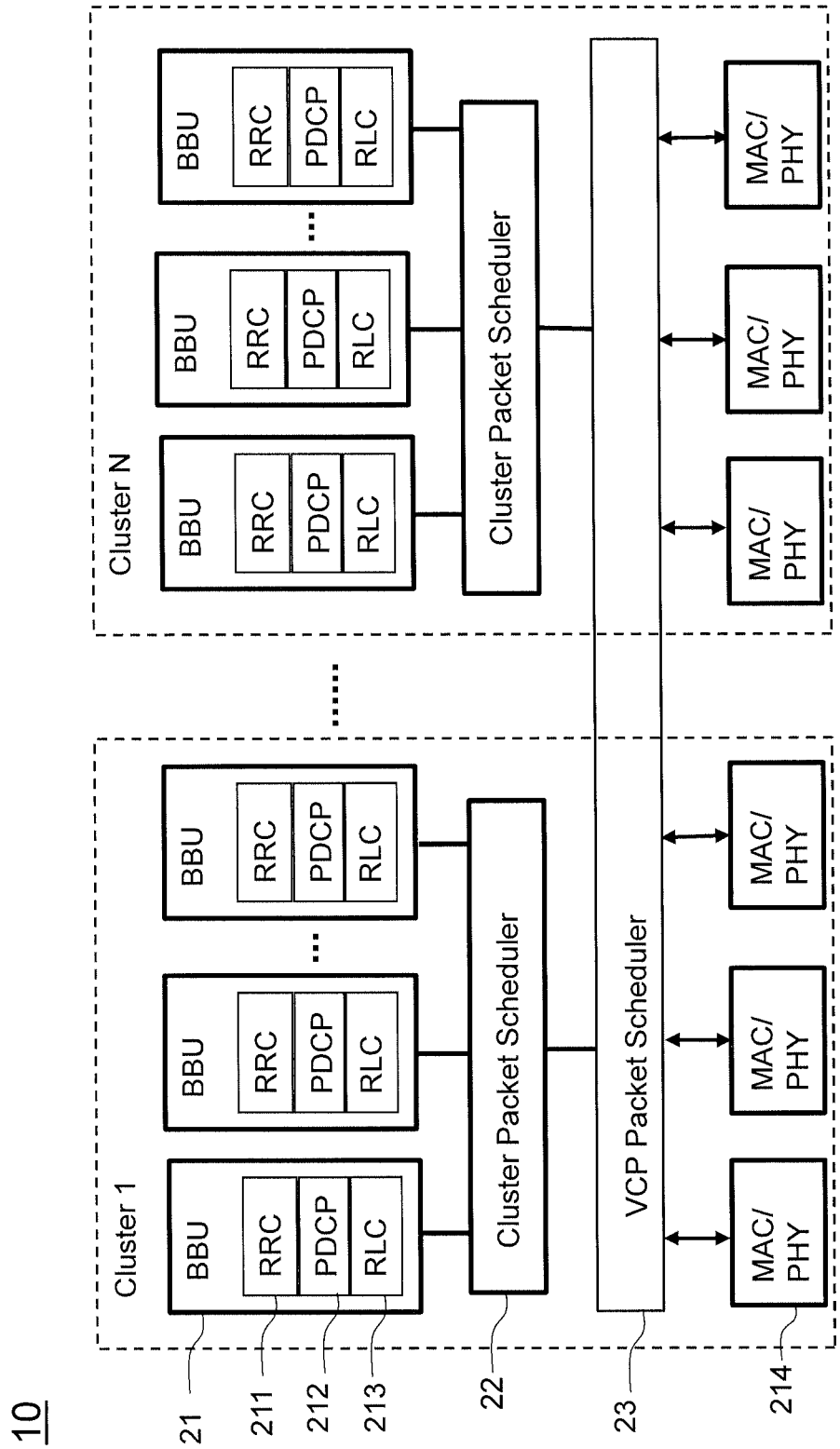
FIG. 2 is a schematic diagram of the logical components of the system.

FIG. 2 is a schematic diagram of the logical components of the system 1. The base station server 10 comprises a plurality of clusters of Baseband processing Units (BBUs) 21. The BBUs 21 of each cluster of BBUs are connected to a respective cluster packet scheduler 22. Each cluster packet scheduler 22 can control each of the BBUs 21 connected to the cluster packet scheduler 22 to coordinate and/or manage packet scheduling and/or resource allocations. Also, the BBUs 21 of each cluster of BBUs may be jointly coordinated by a corresponding cluster packet scheduler 22.

In this embodiment, the base band server 10 is implemented on a Virtual Cloud Platform (VCP), and each cluster packet scheduler 22 is connected to a VCP packet scheduler 23. All of the BBUs of the system 1 may be jointly coordinated by the VCP packet scheduler 23. Each BBU 21 is connected to a corresponding base station client 11a, 12a, 13a via a corresponding cluster packet scheduler 22, and the VCP packet scheduler 23.

Each BBU 21 comprises a RRC processing entity 211, a PDCP processing entity 212 and a RLC processing entity 213. Each BBU 21 is associated with a corresponding MAC/PHY processing entity 214. It is envisaged that the baseband processing conventionally performed by a conventional eNodeB can be performed by a base station client 11a, 12a, 13a, a corresponding BBU 21, a corresponding cluster packet scheduler 22, a corresponding MAC/PHY processing entity 214 and the VCP packet scheduler 23 of the system 1.

Figure 3:
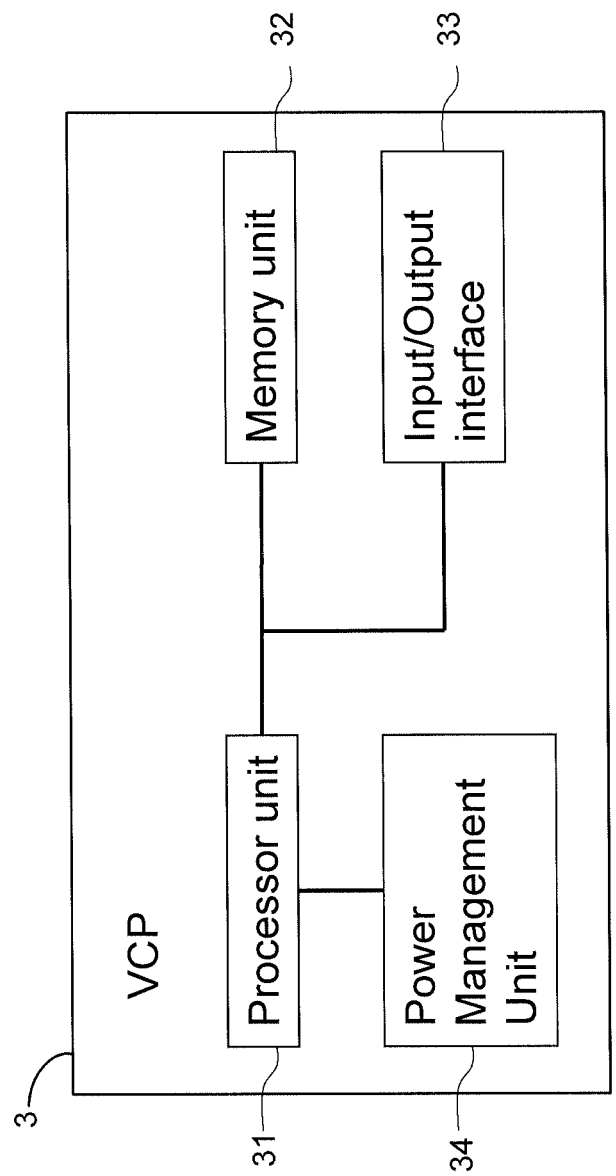
FIG. 3 is a schematic diagram of the physical components of the base station server.

FIG. 3 is a schematic diagram of the physical components of the VCP 3 implementing the base station server 10. The VCP 3 includes a processor unit 31, a memory unit 32, an input/output interface 33 and a power management unit 34. The processor unit 31 is logically or electrically connected to the memory unit 32, the input/output interface 33 and the power management unit 34. It is envisaged that the VCP 3 may be a blade server, and the processor unit 31 may be a multi-core processor. The memory unit 32 may include static memory storage devices and dynamic memory storage devices.

The processor unit 31 is configured to implement (or execute) a number of software modules based on program code and/or data stored in the memory unit 32. For example, the memory unit 32 stores program code for implementing software modules corresponding to the RRC processing entity 211, the PDCP processing entity 212, the RLC processing entity 213, the MAC/PHY processing 214, the cluster packet scheduler 22 and the VCP packet scheduler entity 23. Persons skilled in the art will appreciate that one or more of the software modules could alternatively be implemented in some other way, for example, by one or more dedicated circuits.

The input/output interface 33 is an interface for connecting each BBU 21 to a corresponding base station client 11a, 12a, 13a. The power management unit 34 includes a power supply (not shown) for providing electrical power to the VCP 3 and management logics (not shown) for controlling the supply of power to the VCP 3.

Figure 4:
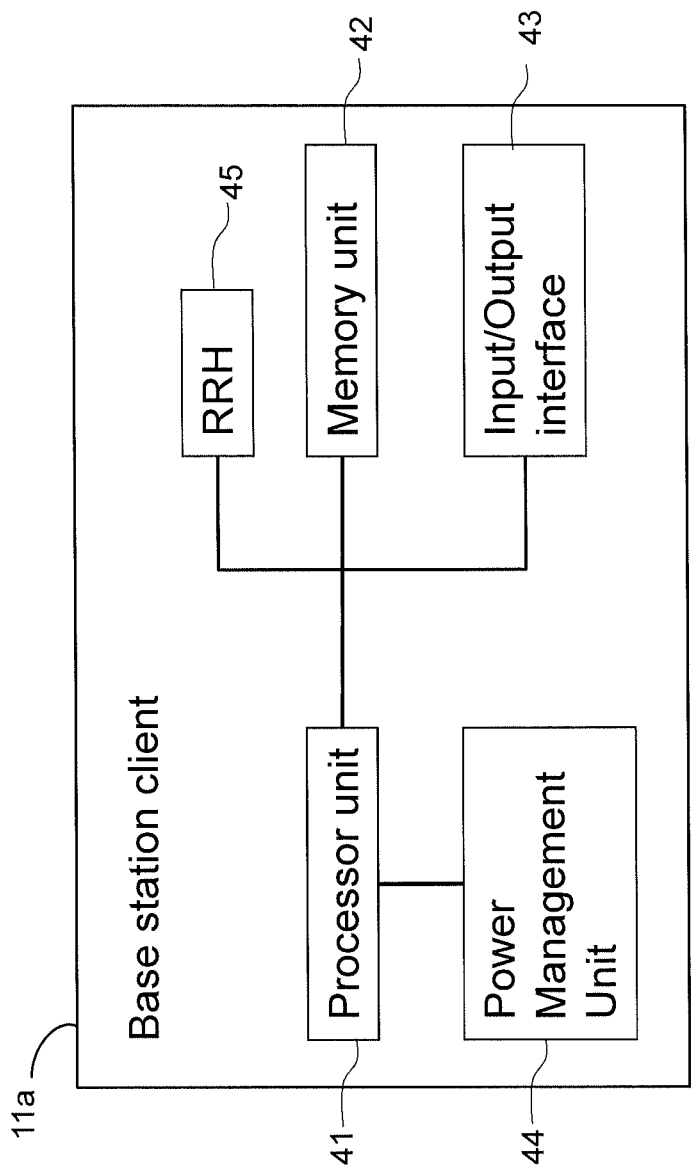
FIG. 4 is a schematic diagram of the physical components of a base station client.

FIG. 4 is a schematic diagram of the physical components of a base station client 11a, 12a, 13a. Each base station client 11a, 12a, 13a includes a processor unit 41, a memory unit 42, an input/output interface 43, a power management unit 44, and a Remote Radio Head (RRH) 45. The RRH 45 comprises Radio Frequency (RF) circuitry for transmitting and/or receiving RF signals conforming to the 3GPP LTE standard. It is envisaged that the RRH 45 may include an antenna (not shown) and RF signal processing components (not shown) such as, but not limited to, a Digital-to-Analogue signal converter (DAC), an Analogue-to-Digital signal converter (ADC), an oscillation signal generator, a modulator, a demodulator, a power amplifier, and a bandpass filter.

The processor unit 41 is logically or electrically connected to the memory unit 42, the input/output interface 43, the power management unit 44, and the RRH 45. It is envisaged that the processor unit 41 may be a multi-core processor. The memory unit 42 may include static memory storage devices and dynamic memory storage devices. The processor unit 41 is configured to implement (or execute) a number of software modules based on program code and/or data stored in the memory unit 42. For example, the memory unit 42 may store program code for implementing software modules corresponding to a MAC/PHY processing entity corresponding to the MAC/PHY processing entity 214 of FIG. 2. Persons skilled in the art will appreciate that one or more of the software modules could alternatively be implemented in some other way, for example, by one or more dedicated circuits.

The input/output interface 43 is an interface for connecting the base station client 11a, 12a, 13a to the base station server 10. The power management unit 44 includes a power supply (not shown) for supplying electrical power to the base station client 11a, 12a, 13a and management logics (not shown) for controlling the electrical power supply to the base station client 11a, 12a, 13a.

Further Details of the System

Figure 5:
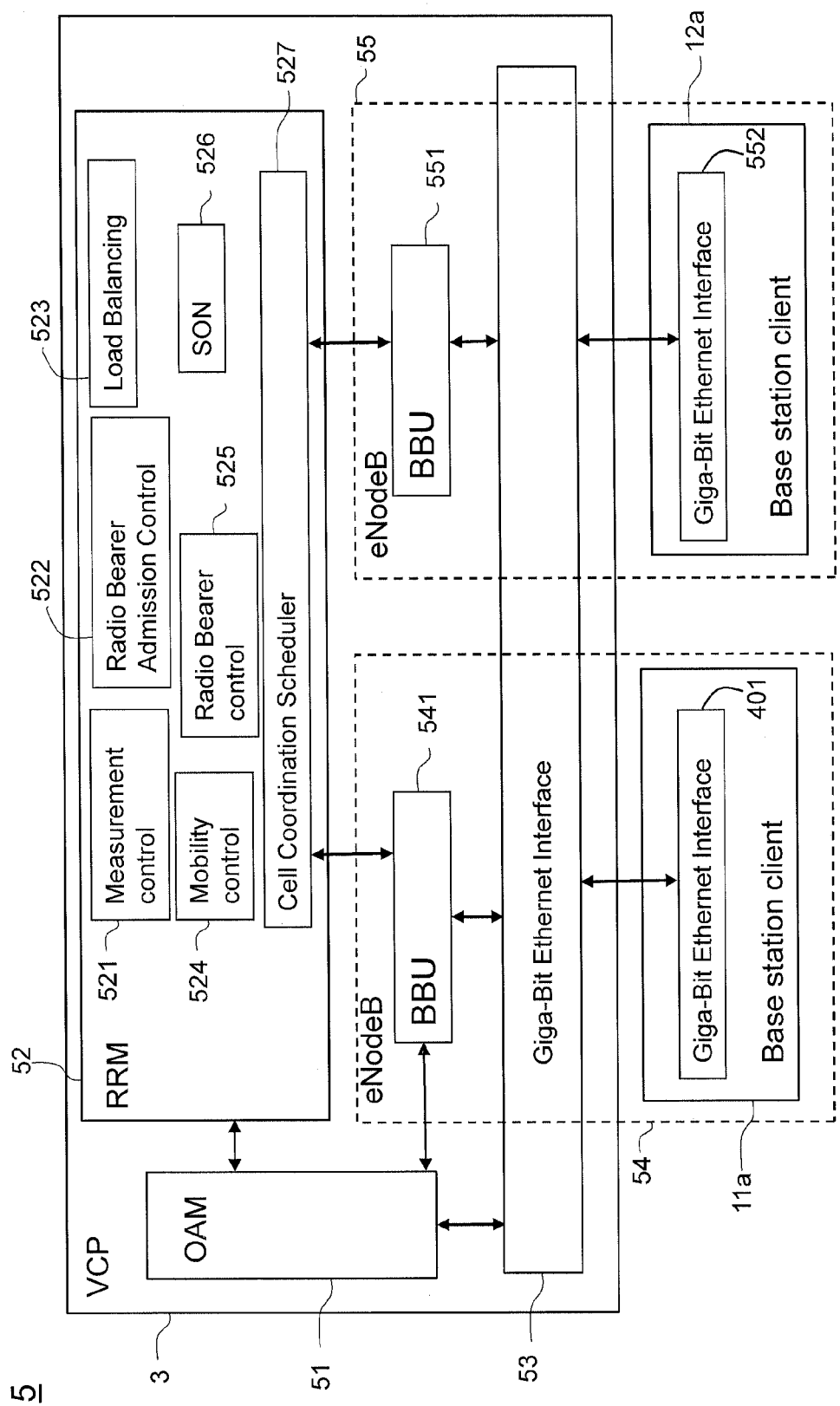
FIG. 5 is a schematic diagram of some of the functional components of the base station server and the base station client.

FIG. 5 is a schematic diagram of the functional components (shared functional components) implemented on the VCP 3 to manage the BBUs 21 of the base station server 10. In FIG. 5, only part 5 of the system 1 (more specifically, only two of the BBUs 541, 551 and two of the base station clients 11a, 12a) is illustrated. In FIG. 5, the baseband processing conventionally performed by a conventional eNodeB is performed by an eNodeB 54, 55 comprising a BBU 541 and a corresponding base station client 11a, 12a.

The VCP 3 comprises a carrier Ethernet Internet Protocol (IP) interface in the form of a Giga-bit Ethernet interface 53. Each BBU 541, 551 is connected to a corresponding base station client 11a, 12a via the Giga-bit Ethernet interface 53 and a Giga-bit Ethernet interface 401, 552 of the base station client 11a, 12a.

The VCP 3 also includes a Radio Resource Management (RRM) entity 52 including: a measurement control entity 521, a radio bearer admission control entity 522, a load balancing entity 523, a mobility control entity 524, a radio bearer control entity 525, a Self-Organizing Network (SON) entity 526 and a cell coordination scheduler 527. Each BBU 541, 551 is connected to the measurement control entity 521, the radio bearer admission control entity 522, the load balancing entity 523, the mobility control entity 524, the radio bearer control entity 525 and the SON entity 526 via the cell coordination scheduler 527. The cell coordination scheduler 527 performs radio resource allocation and packet scheduling for each BBU 541, 551 and corresponding base station client 11a, 12a. The cell coordination scheduler 527 implements the cluster packet scheduler 22 and the VCP packet scheduler 23 of FIG. 2.

The measurement control entity 521 controls broadcasting or transmission of dedicated control/signalling information such that a UE in data communication with a BBU 541, 551 of the VCP 3 can, according to the control/signalling information, perform measurements for intra/inter-frequency mobility. The radio bearer admission control entity 522 determines whether a new radio bearer can be accepted by the system 1, 5, according to currently available radio resource (such as the currently available radio resource of the serving cell base station client 11a, 12a). The load balancing entity 523 perform load balancing algorithms (such as intra-frequency, inter-frequency or inter-Radio Access Technology (RAT) algorithms for performing handovers). The mobility control entity 524 performs determinations related to mobility of UEs, for example, during handover and Tracking Area Update (TAU). The radio bearer control entity 525 establishes, maintains, and releases radio bearers, and to configure radio resources associated with radio bearers. The SON entity 526 exchanges information (such as an Automatic Neighbour Relation function) between neighbouring eNodeBs 54, 55. It is also envisaged that the SON entity 526 may perform automatic Physical Cell Identity (PCI) selection, dynamic configuration of X2/S1 interfaces, Random Access Channel (RACH) parameter optimization, and mobility parameter optimization.

The VCP 3 also includes an Operation Administration Monitoring (OAM) entity 51. The OAM entity 51 is logically connected to the RRM entity 52, each BBU 541, 551 and the Giga-bit Ethernet interface 53. The OAM entity 51 performs OAM/control operations. In particular, the OAM entity 51 performs OAM/control of a MAC sub-layer processing entity (not shown) and a PHY sub-layer processing entity (not shown). It is envisaged that such OAM/control typically involves relevant MAC and PHY sub-layers configuration information. It is envisaged that the OAM entity 51 may interact with the RRM entity 52 and directly transmit/receive control/signalling information to/from a RRC sub-layer processing entity (not shown) of each BBU 541, 551. Also, the OAM entity 51 may transmit/receive, over the Giga-bit Ethernet interface 53, OAM/control and configuration information to/from a corresponding OAM entity (not shown) of each base station client 11a, 12a.

Figure 8:
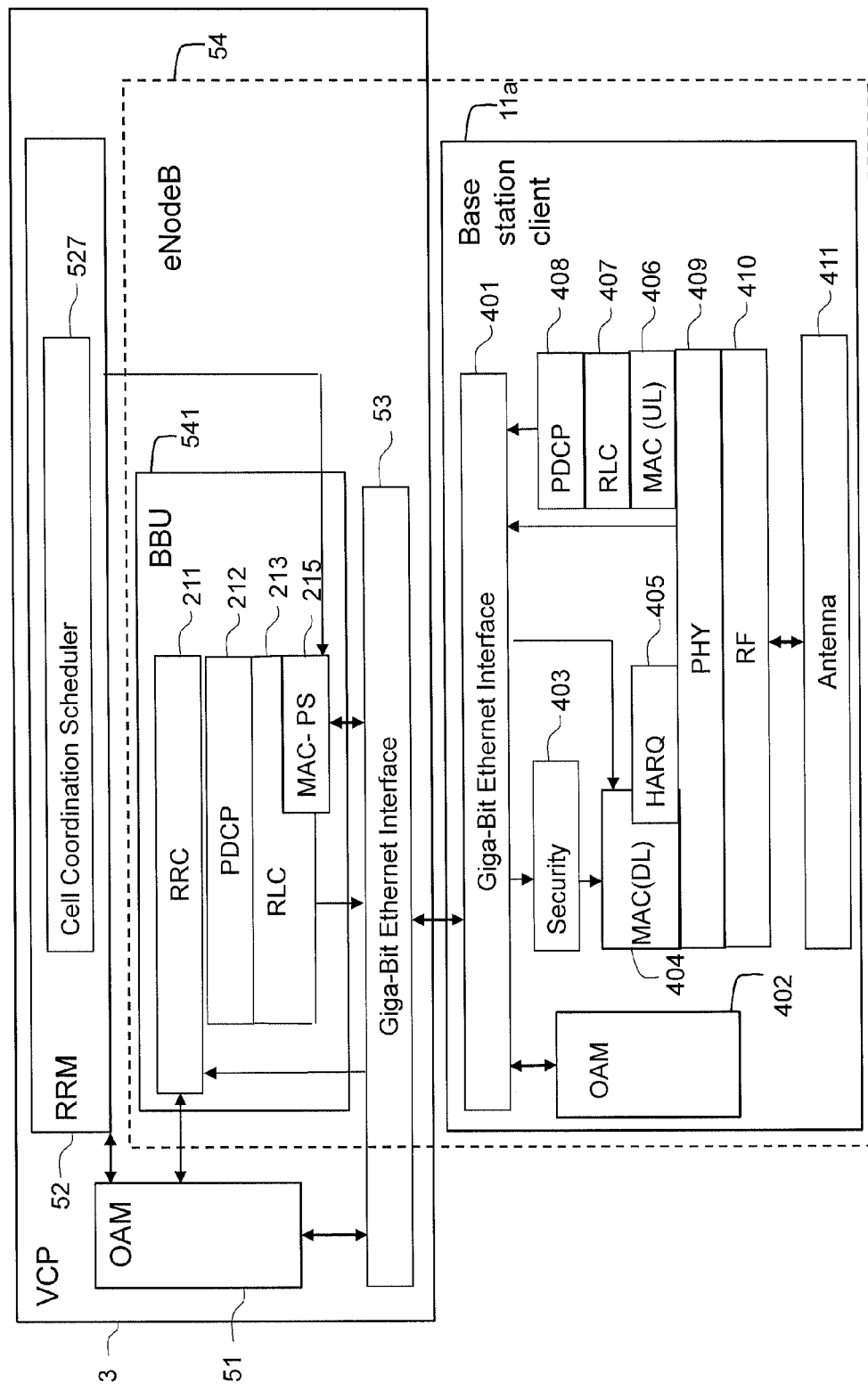
FIG. 8 is a schematic diagram of the other functional components of the base station server and the functional components of the base station client.

FIG. 8 is a schematic diagram of the functional components of a BBU 541 and a base station client 11a of the embodiment of the system 1, 5 of FIG. 5. In FIG. 8, some of the shared functional components (such as the measurement control entity 521, the radio bearer admission control entity 522, the load balancing entity 523, the mobility control entity 524, the radio bearer control entity 525 and the SON entity 526 of the RRM 52) of the system 1, 5 are not shown.

The BBU 541 comprises a RRC processing entity 211, a PDCP processing entity 212, a RLC processing entity 213, and a MAC-Packet Scheduler (MAC-PS) processing entity 215. The RRC processing entity 211 is logically connected to the cell coordination scheduler 527 and the OAM entity 51 of the VCP 3. The RRC processing entity 211, the RLC processing entity 213 and the MAC-PS processing entity 215 are logically connected to the base station client 11a via the Giga-bit Ethernet Interface 53 of the VCP 3.

The base station client 11a comprises a security entity 403, a MAC downlink (DL) processing entity 404, a HARQ entity 405, a RLC processing entity 407, a PDCP processing entity 408, a PHY layer processing entity 409, a RF unit 410, an antenna unit 411, an OAM processing entity 402 and a MAC uplink (UL) processing entity 406. The MAC (DL) processing entity 404, the PHY processing entity 409, and the RF unit 410 are logically connected to the OAM processing entity 402 of the base station client 11a. The security entity 403 is logically connected to the RLC processing entity 213 of the BBU 541. The MAC (DL) processing entity 404 is logically connected to the MAC-PS processing entity 215 of the BBU 541. The PHY processing entity 409 is logically connected to the MAC-PS processing entity 215 of the BBU 541. The PDCP processing entity 408 is logically connected to the RRC processing entity 211 of the BBU 541.

The RRC processing entity 211 of the BBU 541 is responsible for performing RRC sub-layer processing in both the uplink and the downlink. Persons skilled in the art will appreciate the RRC sub-layer processing may include processing of control/signalling information in the control plane and/or of data in the user plane.

The PHY layer processing entity 409, the RF unit 410 and the antenna unit 411 are responsible for performing PHY layer signal processing such as RF signal processing in both the uplink and the downlink. Together, the PHY processing entity 409, the RF unit 410 and the antenna unit 411 form the RRH 45 of FIG. 4.

The OAM processing entity 402 of the base station client 11a passes OAM/control and configuration information to the MAC (DL) processing entity 404, the PHY processing entity 409, and the RF unit 410. It is envisaged that OAM/control and configuration information may be communicated between the OAM processing entity 51 of the VCP 3 and the OAM processing entity 402 of the base station client 11a in both the uplink and the downlink.

PDCP, RLC and MAC sub-layer processing is split between the BBU 541 and the base station client 11a such that processing that is less latency critical is performed by the BBU 541 and processing that is more latency critical is performed by the base station client 11a.

In the downlink, the PDCP processing entity 212, the RLC processing entity 213, and the MAC-PS processing entity 215 of the BBU 541 and the MAC (DL) processing entity 404 and the HARQ processing entity 405 of the base station client 11a are responsible for processing control/signalling information in the control plane and/or data in the user plane.

The PDCP processing entity 212 of the BBU 541 is responsible for performing downlink PDCP sub-layer processing. For example, the PDCP processing entity 212 of the BBU 541 receives information on radio bearers, and map the information onto logical channels in the form of at least one RLC PDU. In particular, the PDCP processing entity 212 of the BBU 541 receives one or more packets (such as Internet Protocol (IP) packets from, for example, a connection point at the core network), perform Robust Header Compression (ROHC) of the header of one or more of the received data packets, and transmit the compressed data packets to the RLC processing entity of the BBU 541 for RLC sub-layer processing.

The RLC processing entity 213 of the BBU 541 is responsible for performing downlink RLC sub-layer processing. More specifically, the RLC processing entity 213 of the BBU 541 performs a conversion of at least one RLC SDU to at least one RLC PDU, by receiving the at least one RLC SDU from the PDCP processing entity 212, converting the at least one RLC SDU to at least one RLC PDU (for example, by segmenting a RLC SDU into a plurality of RLC PDUs or concatenating a plurality of RLC SDUs into one RLC PDU), and transmitting the at least one RLC PDU to the base station client 11a.

Downlink MAC sub-layer processing is performed by two separate parts of a split downlink MAC processing entity comprising the MAC-PS processing entity 215 of the BBU 541 and the MAC downlink (DL) processing entity 404 of the base station client 11a. The MAC-PS processing entity 215 of the BBU 541 is responsible for determining downlink MAC sub-layer scheduling policies. In particular, the MAC-PS processing entity 215 of the BBU 541 generates, for each Transmission Time Interval (TTI), Resource Block (RB) resource allocations and a Control Format Indicator (CFI), and transmits the generated RB resource allocations and CFI to the base station client 11a. Scheduling control and coordination information may be transmitted from the cell coordination scheduler 527 of the BBU 541 to the MAC-PS processing entity 215 of the BBU 541.

The MAC (DL) processing entity 404 of the base station client 11a is responsible for performing (or implementing) the downlink MAC sub-layer scheduling policies determined by MAC-PS processing entity 215 of the BBU 541. For example, the MAC (DL) processing entity 404 of the base station client 11a controls transmissions or retransmissions of the at least one RLC PDU from the RLC processing entity 213 based on the RB resource allocations and CFI generated by the MAC-PS processing entity 215 of the BBU 541. That is, the MAC (DL) processing entity 404 controls for each TTI whether or not the base station client 11a makes a new RLC PDU transmission or to send a retransmission of RLC PDU in the TTI. It is envisaged that downlink MAC sub-layer processing is performed by the MAC (DL) processing entity 404 for all UEs within radio service coverage of the base station client 11a.

The security entity 403 of the base station client 11a is responsible for integrity of transmitted or received control/signalling information in the control plane and/or data in the user plane. For example, the security entity 403 encrypts the at least one RLC PDU generated by the RLC processing entity 213 of the BBU 541, before transmission or retransmission of the encrypted RLC PDU.

The HARQ processing entity 405 of the base station client 11a is responsible for informing the MAC (DL) processing entity 404 of the base station client 11a whether or not a transmission to a UE has been successfully received by the UE in the downlink. In particular, the HARQ processing entity 405 of the base station client 11a transmits any ACK/NACK received from the UE to the MAC (DL) processing entity 404 of the base station client 11a in the downlink. By implementing the HARQ processing entity 405 together with the MAC (DL) processing entity 404 and the PHY layer processing entity 409 at the base station client 11a, it is expected that RLC PDUs requiring retransmission can be retransmitted directly from the base station client 11a without first being transmitted from the BBU 541 to the base station client 11a.

It is envisaged that the HARQ processing entity 405 of the base station client 11a may manage up to 8 HARQ processes per UE. Also, it is envisaged that communications between the MAC (DL) processing entity 404 and the HARQ processing entity 405 may include Downlink Control Information (DCI) related to Transport Blocks (TBs) to be transmitted to a UE in a TTI. Examples of DCI include HARQ process numbers and New Data Indicators (NDIs). Also, the DCI may alternatively or additionally include Modulation and Coding Scheme (MCS) information, Redundancy Version (RV) information, RB allocations information and/or antenna mapping information for L1 layer coding and modulation.

Turning to the uplink, the HARQ processing entity 405, the MAC (UL) processing entity 406, the RLC processing entity 407, and the PDCP processing entity 408 of the base station client 11a are responsible for processing control/signalling information in the control plane and/or data in the user plane.

The HARQ processing entity 405 of the base station client 11a is responsible for deriving one or more Transport Blocks (TBs) from RF signals received by the PHY processing entity 409 of the base station client 11a. The output of the HARQ processing entity 405 comprises TBs which have been correctly received. Persons skilled in the art will appreciate that TBs may be received out of sequence by the base station client 11a due to retransmissions. In addition to the correctly received TBs, the HARQ processing entity 405 delivers Cyclic Redundancy Checks (CRCs) and ACKs/NACKs to the MAC (UL) processing entity 406 for transmission to a UE. It is envisaged that such information may also be provided to the MAC (DL) processing entity 404 for performing downlink processing.

The MAC (UL) processing entity 406 of the base station client 11a generates at least one RLC PDU from the TBs output by the HARQ processing entity 405 of the base station client 11a. The MAC (UL) processing entity 406 of the base station client 11a is also generates information such as received CQI reports, acknowledgements (ACKs)/negative ACKs (NACKs), RACH Preambles, MAC control element (CE) information, and to transmit the generated information to the BBU 541. It is envisaged that the information may be generated independently by the MAC (UL) processing entity 406 of the base station client 11a or together in conjunction with the PHY processing entity 409 of the base station client 11a. It is envisaged that the RB resource allocations and CFI generated for each TTI by the MAC-PS processing entity 215 of the BBU 541 may be based on at least part of the information generated by the MAC (UL) processing entity 406 and the PHY processing entity 409 of the BBU 541. Also, The RLC processing entity 407 of the base station client 11a is responsible for performing uplink RLC sub-layer processing. In particular, the RLC processing entity 407 of the base station client 11a performs a conversion of the at least one RLC PDU generated by the MAC (UL) processing entity 406 of the base station client 11a to at least one RLC SDU, by receiving the at least one RLC PDU from the MAC (UL) processing entity 406, converting the at least one RLC PDU to at least one RLC SDU (for example, by reassembling a plurality of RLC PDUs into a RLC SDU), and transmitting the at least one RLC SDU to the PDCP processing entity 408 of the base station client 11a.

The PDCP processing entity 408 of the base station client 11a is responsible for performing uplink PDCP sub-layer processing. In particular, the PDCP processing entity 408 of the base station client 11a performs a de-compression of one or more of the SDUs received from the RLC processing entity 407 of the base station client 11a, and to forward the SDU or SDUs (including those that are de-compressed by the PDCP processing entity 408) received from the RLC processing entity 407 of the base station client 11a to an appropriate entity. More specifically, the PDCP processing entity 408 de-compresses the header of each of the one or more SDUs according to ROHC (that is, the Robust Header Compression framework), and forwards (i) the de-compressed header of each one of the SDUs together with (ii) the corresponding payload to the appropriate entity. It is envisaged that packets received from a UE in the user plane may be processed and then forwarded by the PDCP processing entity 408 of the base station client 11a to an appropriate entity such as a connection point at the core network, and packets received from a UE in the control plane may be forwarded by the PDCP processing entity 408 of the base station client 11a to an appropriate entity such as the RRC processing entity 211 of the BBU 541.

Figure 11:
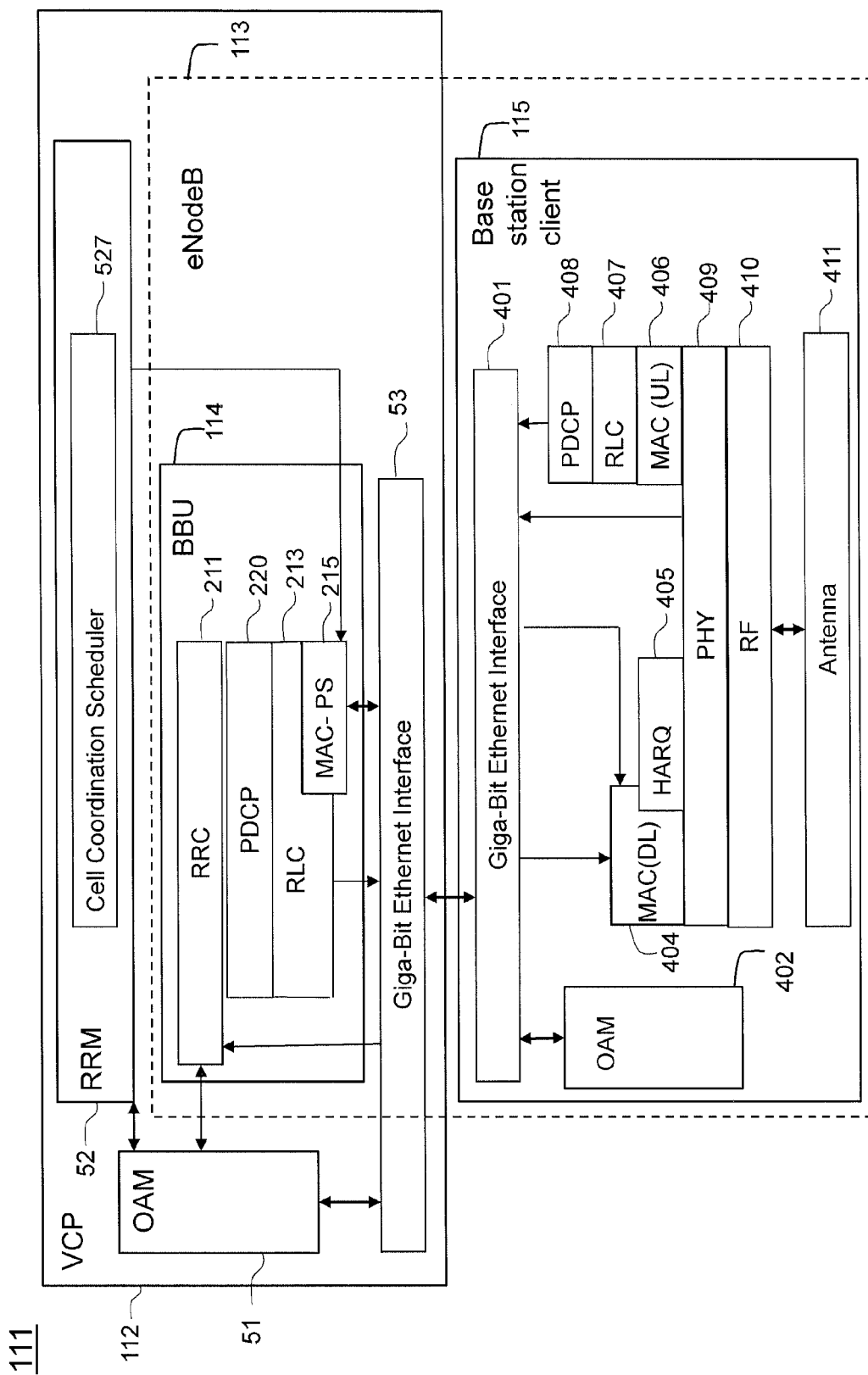
FIG. 11 is schematic diagram of the other functional components of the base station server of an alternative embodiment of the system, and the functional components of the base station client of the alternative embodiment of the system.

FIG. 11 is schematic diagram of the functional components of the BBU 114 and the base station client 115 of an alternative embodiment of the system 111. This alternative embodiment is almost the same as the embodiment of FIG. 8, except that encryption and decryption of RLC PDUs is performed by a PDCP processing entity 220 of the BBU 114 of the system 111 (as opposed to a separate security entity 403 at a base station client 11a in the embodiment of FIG. 8).

Figures 15A, 15B:
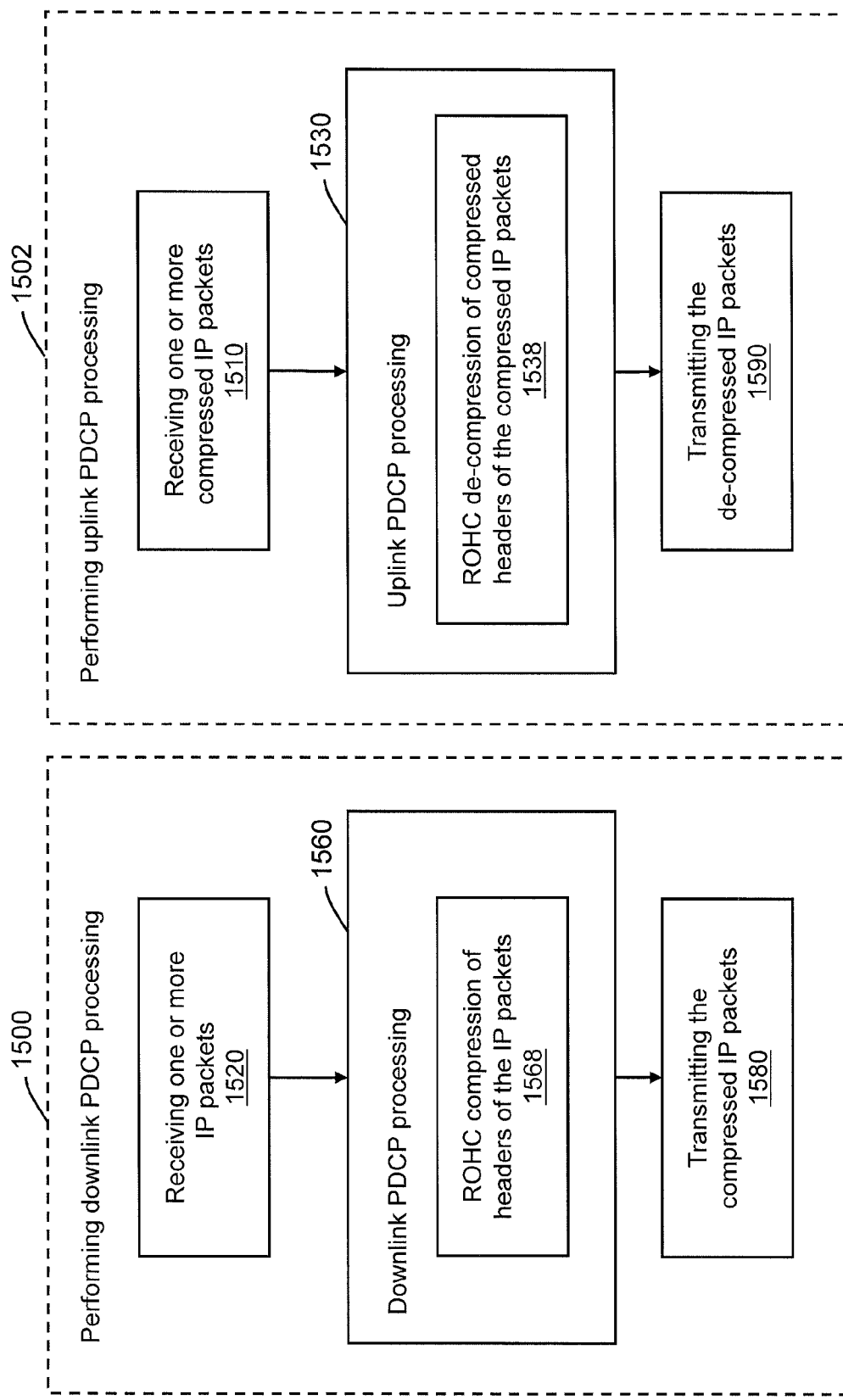
FIGS. 15A and 15B are two flowcharts illustrating, respectively, an embodiment of a method of compressing packets and an embodiment of a method of decompressing packets.

FIGS. 15A and 15B are two flowcharts 1500, 1502 illustrating respectively an embodiment of a method of compressing packets, and an embodiment of a method of de-compressing packets. More specifically, the flowchart 1500 of FIG. 15A illustrates the steps to compress IP packets received from a connection point at the core network in the downlink, and the flowchart 1502 of FIG. 15B illustrates the steps to de-compress compressed IP packets received from the RLC processing entity 407 of the base station client 11a, 12a, 13a in the uplink.

Beginning first with the flowchart 1500 of FIG. 15A, in step 1520, the PDCP processing entity 212 implemented on the VCP 3 of the base station server 10 receives one or more IP packets from the connection point to the core network. Each of the IP packets comprises an IP header and a payload.

In step 1560, the PDCP processing entity 212 performs downlink PDCP processing according to the PDCP protocol specified in the 3GPP LTE standard. In particular, in step 1568, the PDCP processing entity 212 compresses the IP header of each of one or more of the received IP packets, according to the ROHC framework specified in the 3GPP LTE standard.

In step 1580, the PDCP processing entity 212 transmits the compressed and uncompressed IP packets (that is, the received IP packets comprising IP headers compressed by the PDCP processing entity 212, and the received IP packets comprising IP headers that are not compressed by the PDCP processing entity 212) to the RLC processing entity 213 implemented on the VCP 3 of the base station server 10 for further processing.

Turning to the flowchart 1502 of FIG. 15B, in step 1510, the PDCP processing entity 408 of the base station client 11a, 12a, 13a receives one or more compressed IP packets. Each one of the compressed IP packet is a RLC SDU transmitted from an uplink user device to the base station client 11a, 12a, 13a over an uplink radio channel specified in the 3GPP LTE standard. Each one of the compressed IP packet comprises a compressed IP header and a payload.

In step 1530, the base station client 11a, 12a, 13a performs uplink PDCP processing on the compressed IP packets received from the uplink user device, according to the PDCP protocol specified in the 3GPP LTE standard. In particular, the PDCP processing entity 408 de-compresses the compressed IP header of each of the compressed IP packets in step 1538.

In step 1590, the base station client 11a, 12a, 13a transmits (i) the IP header (now de-compressed by the PDCP processing entity 408) of each of the IP packets together with (ii) the corresponding payload to the base station server 10 via the Giga-Bit Ethernet interface 401 of the base station client 11a, 12a, 13a for further processing (for example, for the base station server 10 to transmit to the connection point at the core network).

Figures 14A, 14B:
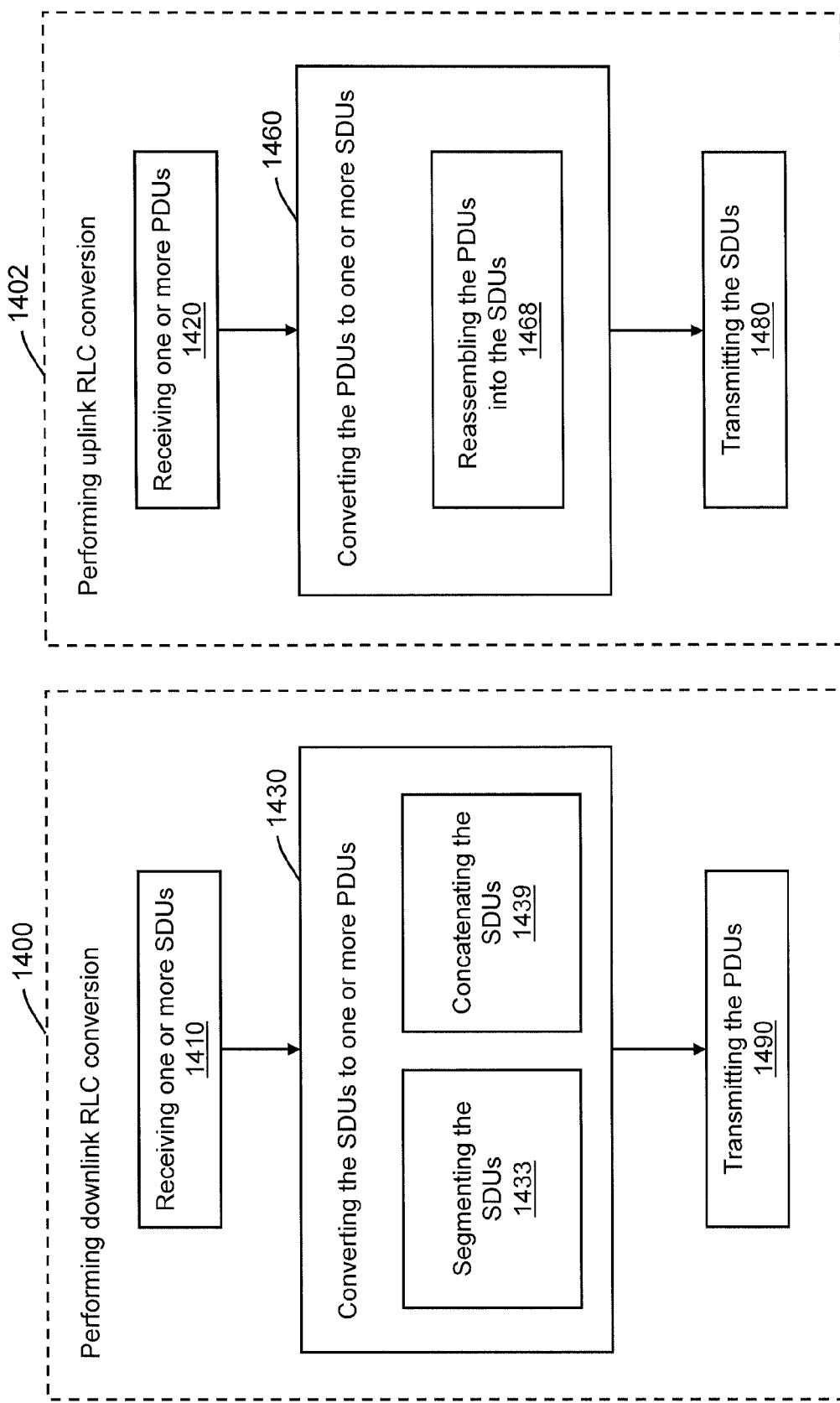
FIGS. 14A and 14B are two flowcharts illustrating an embodiment of a method performed by the base station client and the base station server of the system.

FIGS. 14A and 14B are two flowcharts 1400, 1402 illustrating an embodiment of a method of converting between RLC SDUs and RLC PDUs performed by a base station client 11a, 12a, 13a and a base station server 10 of the system 1, 5 of FIGS. 1 to 5 and 8. More specifically, the flowchart 1400 of FIG. 14A illustrates the steps performed by the base station server 10 to perform a conversion of at least one RLC SDU to at least one RLC PDU in the downlink, and flowchart 1402 of FIG. 14B illustrates the steps performed by the base station client 11a, 12a 13a to perform a conversion of at least one RLC PDU to at least one RLC SDU in the uplink.

Beginning first with the flowchart 1400 of FIG. 14A, in step 1410, the RLC processing entity 213 implemented on the VCP 3 of the base station server 10 receives one or more RLC SDUs from the PDCP processing entity 212 implemented on the VCP 3.

In step 1430, the RLC processing entity 213 converts the received RLC SDUs into one or more RLC PDUs according to the RLC protocol specified in the 3GPP LTE standard. For example, the RLC processing entity 213 may convert a received RLC SDU into a plurality of RLC PDUs, by segmenting the received RLC SDU into the plurality of RLC PDUs in step 1433. In another example, the RLC processing entity 213 may convert a plurality of received RLC SDUs into a RLC PDU, by concatenating the plurality of received RLC SDUs into the RLC PDU in step 1439.

In step 1490, the RLC processing entity 213 transmits the RLC PDUs to the base station client 11a, 12a, 13a via the Giga-Bit Ethernet interface 53 of the base station server 10 for transmission over a radio channel to a UE in the downlink. Upon receiving the RLC PDUs from the base station server 10, the base station client 11a, 12a, 13a then transmits the RLC PDUs over the radio channel to the UE. As indicated above, processing (such as encryption performed by the security entity 403 of the base station client 11a, 12a, 13a) of the RLC PDUs may be performed by the base station client 11a, 12a, 13a on the RLC PDUs received from the base station server 10, before the RLC PDUs is transmitted by base station client 11a, 12a, 13a over the radio channel to the UE.

Turning to the flowchart 1402 of FIG. 14B, in step 1420, the RLC processing entity 407 of the base station client 11a, 12a, 13a receives one or more RLC PDUs from a UE via the MAC (UL) processing entity 406 and the PHY processing entity 409 of the base station client 11a, 12a, 13a.

In step 1460, the RLC processing entity 407 converts the received RLC PDUs into one or more RLC SDUs. More specifically, the RLC processing entity 407 converts the received RLC PDUs into the RLC SDUs, by reassembling the received RLC PDUs into the RLC SDUs according to the RLC protocol specified in the 3GPP LTE standard in step 1468.

In step 1480, the RLC processing entity 407 transmits the RLC SDUs to the PDCP processing entity 408 of the base station client 11a, 12a, 13a for PDCP sub-layer processing (such as ROHC decompression), before the RLC SDUs is transmitted by the base station client 11a, 12a, 13a to the base station server 10 via the Giga-Bit Ethernet interface 401 of the base station client 11a, 12a, 13a.

Figure 6:
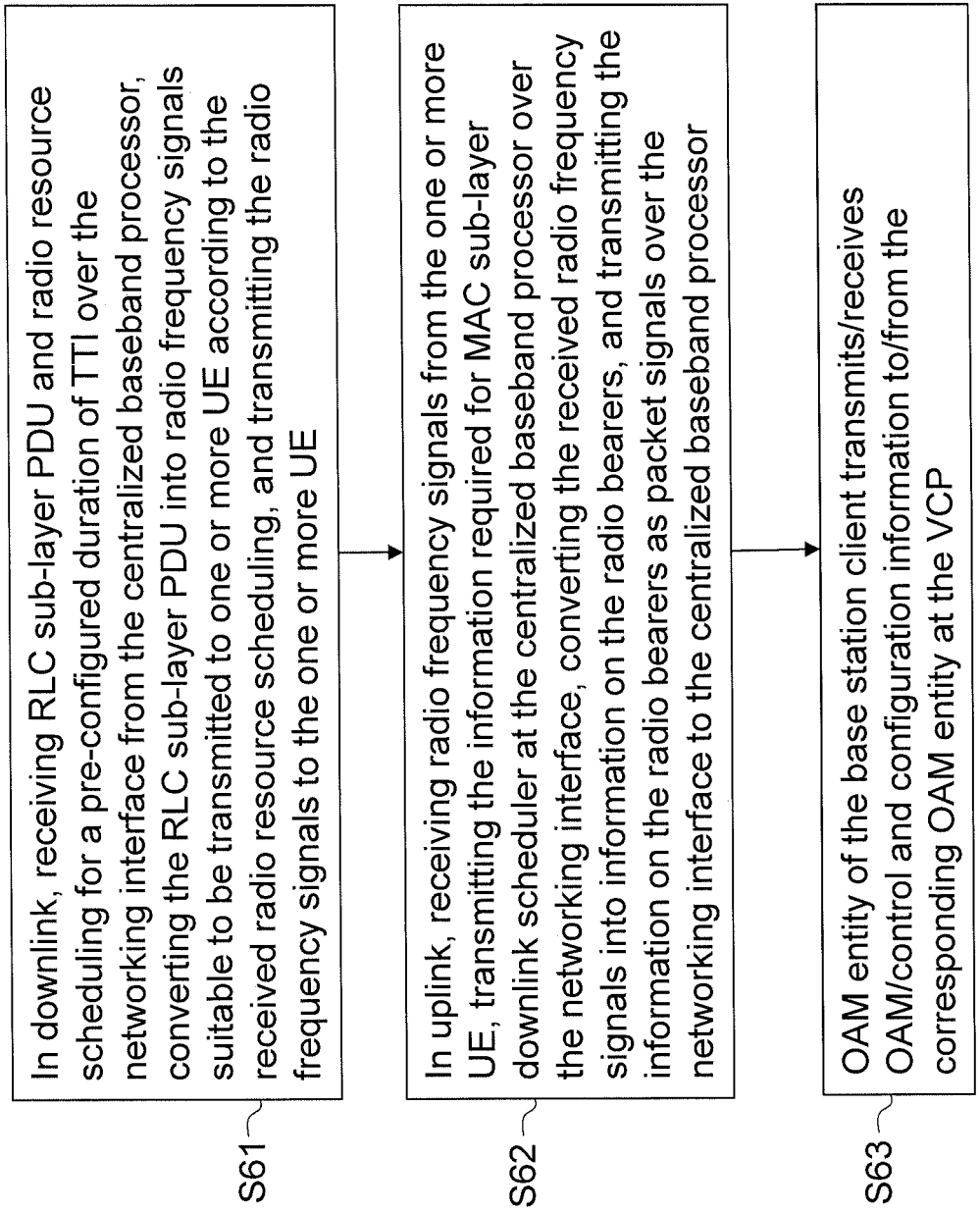
FIG. 6 is a flowchart of an embodiment of a method of operation performed by the base station client of FIG. 5.

FIG. 6 is a flowchart of an embodiment of a method of operation performed by a base station client 11a, 12a, 13a of the embodiment of the system 1, 5 of FIG. 5.

In step S61, the base station client 11a, 12a, 13a of the system 5 performs the following steps in respect of the downlink: receiving one or more RLC PDUs and radio resource scheduling information for a TTI of a pre-configured duration over the Giga-Bit Ethernet interface 401, 552 of the base station client 11a, 12a, 13a from the VCP 3, converting the RLC PDUs into RF signals that are suitable for transmission to one or more UEs according to the received radio resource scheduling information, and transmitting the RF signals to the one or more UEs. The conversion of the RLC PDUs into the RF signals may include performing downlink MAC sub-layer operations and downlink PHY sub-layer operations.

In step S62, the base station client 11a, 12a, 13a performs the following steps in respect of the uplink: receiving RF signals from one or more UEs, transmitting information required for the MAC-PS processing entity 215 of the VCP 3 over the Giga-Bit Ethernet interface 401, 552 of the base station client 11a, 12a, 13a, converting the received RF signals into information on radio bearers, and transmitting the information on the radio bearers as packet signals over the Giga-Bit Ethernet interface 401, 552 to the VCP 3. The conversion of the received RF signals into the information on the radio bearers may include performing uplink MAC sub-layer operations, uplink RLC sub-layer operations and uplink PDCP sub-layer operations.

Also, in step S63, an OAM entity of the base station client 11a transmits/receives OAM/control and configuration information to/from a corresponding OAM entity 51 of the VCP 3 the uplink.

Figure 7:
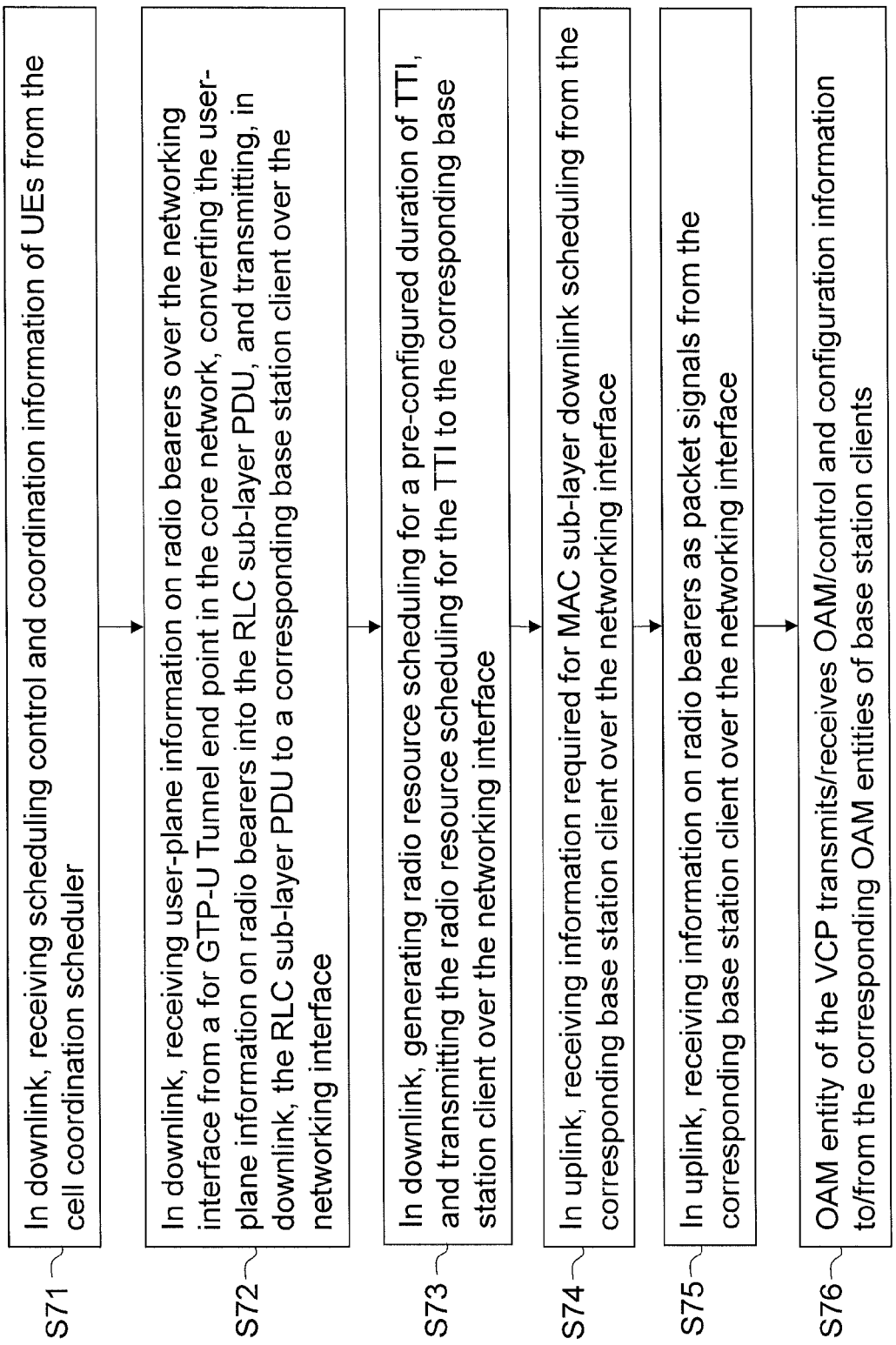
FIG. 7 is a flowchart of an embodiment of a method of operation performed by the base station server of FIG. 5.

FIG. 7 is a flowchart of an embodiment of a method of operation performed by a BBU 541, 551 of the system 5 of FIG. 5.

In step S71, the BBU 541, 551 performs the following steps in respect of the downlink: receiving, for one or more UEs under radio service coverage of a corresponding base station client 11a, 12a, 13a, scheduling control and coordination information of the UEs from the cell coordination scheduler 527.

In step S72, the BBU 541, 551 performs the following steps in respect of the downlink: receiving user-plane information on radio bearers over a networking interface from a connection point at a core network, converting the user-plane information on radio bearers into one or more RLC PDUs, and transmitting the RLC PDUs to a corresponding base station client 11a, 12a, 13a over the Giga-Bit Ethernet interface 401, 552 of the VCP 3. The conversion of the user-plane information on radio bearers into the RLC PDUs may include performing downlink PDCP sub-layer operations and downlink RLC sub-layer operations.

In step S73, the BBU 541, 551 performs the following steps in respect of the downlink: generating, radio resource scheduling information for a TTI of a pre-configured duration, and transmitting the radio resource scheduling information for the TTI to a corresponding base station client 11a, 12a, 13a over the Giga-Bit Ethernet interface 401, 552 of the VCP 3.

In step S74, the BBU 541, 551 performs the following steps in respect of the downlink: receiving information required for MAC sub-layer downlink scheduling from the corresponding base station client 11a over the Giga-Bit Ethernet interface 401, 552 of the VCP 3.

In step S75, the BBU 541, 551 performs the following steps in respect of the downlink: receiving information on radio bearers as packet signals from the corresponding base station client 11a, 12a, 13a over the Giga-Bit Ethernet interface 401, 552 of the VCP 3.

In step S76, the OAM entity 51 of the VCP 3 transmits/receives OAM/control and configuration information to/from corresponding OAM entities of the base station clients 11a, 12a, 13a.

It is envisaged that the steps of the methods of operation illustrated in FIGS. 6 and 7 may be implemented by either the embodiment of the system 1, 5 shown in FIG. 8 or the alternative embodiment of the system 1, 111 shown in FIG. 11.

Figure 9:
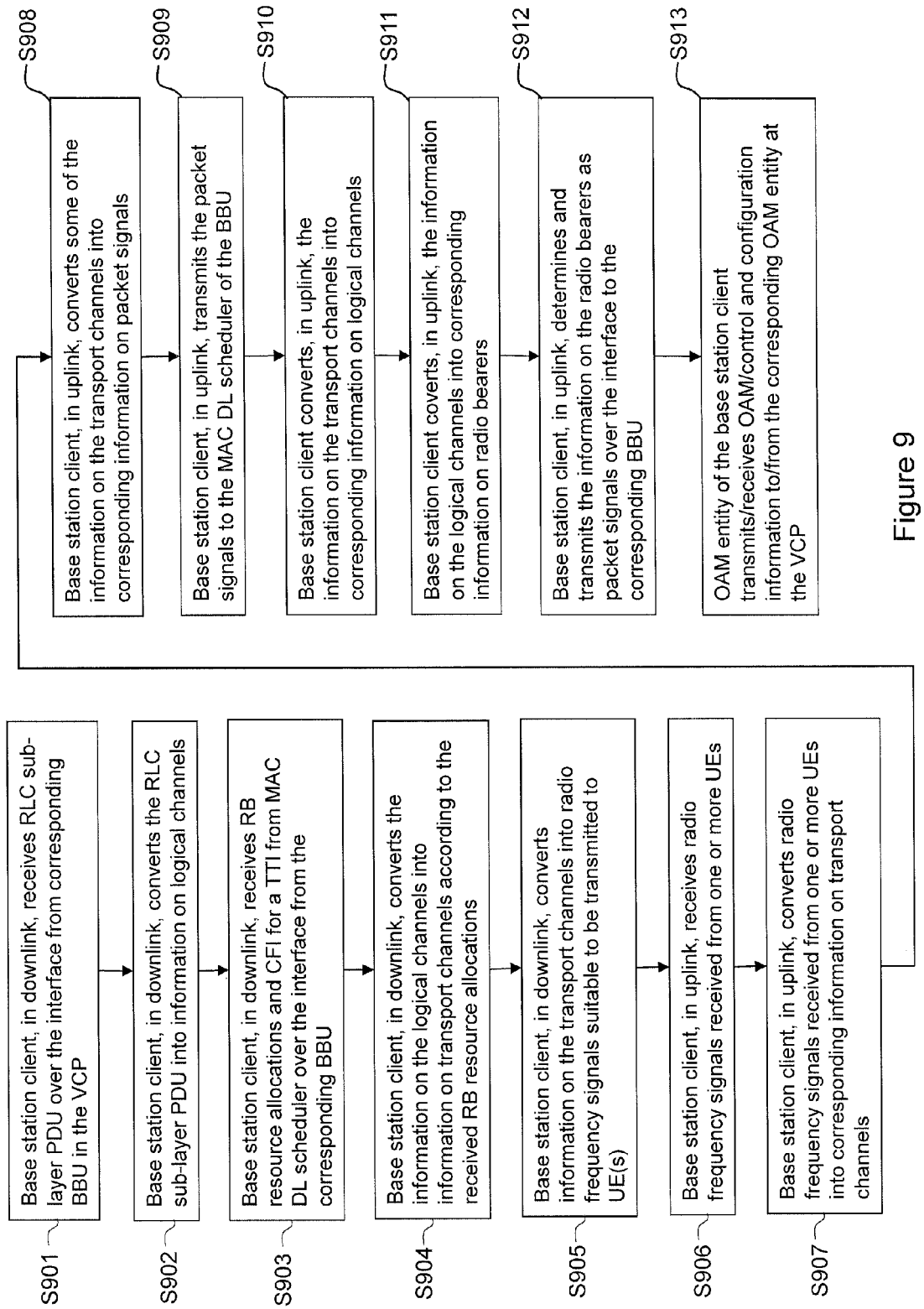
FIG. 9 is a flowchart illustrating in greater detail the steps of FIG. 6 performed by the base station client of FIG. 8.

FIG. 9 is a flowchart illustrating in greater detail the steps of the flowchart of FIG. 6 performed by the base station client 11a, 12a, 13a of the embodiment of the system 1, 5 of FIG. 8. More specifically, step S61 of FIG. 6 is illustrated in greater detail in steps S901 to S905 of FIG. 9, and step S62 of FIG. 6 is illustrated in greater detail in steps S906 to S913 of FIG. 9. That is, steps S901 to S905 describe in greater detail the steps performed by the base station client 11a in the downlink, and steps S906 to S913 describe in greater detail the steps performed by the base station client 11a, 12a, 13a in the uplink.

In step S901, the base station client 11a, 12a, 13a receives the RLC PDUs over the Giga-Bit Ethernet interface 401, 552 of the base station client 11a, 12a, 13a from a corresponding BBU 541, 551.

In step S902, the base station client 11a, 12a, 13a converts the RLC PDUs into information on logical channels. The conversion in step S902 may include: performing a ciphering and integrity protection process on PDCP SDUs encapsulated in the RLC PDUs using the security entity 403 of the base station client 11a, 12a, 13a. Conventionally, ciphering and integrity protection of PDCP SDUs is performed by specialized hardware implemented by a conventional eNodeB to perform PDCP processing. In this embodiment, ciphering and integrity protection is performed by the security entity 403 of the base station client 11a, 12a, 13a which is separate to the PDCP processing entity 212 of the BBU 541, 551.

In step S903, the base station client 11a, 12a, 13a receives RB resource allocations and a CFI for a TTI from the MAC-PS processing entity 215 of the BBU 541 over the Giga-bit Ethernet Interface 401 from the BBU 541, 551. It is envisaged that the MAC-PS processing entity 215 may perform downlink MAC sub-layer packet scheduling operations and generate RB resource allocations and CFIs.

In step S904, the base station client 11a, 12a, 13a converts the information on the logical channels into information on transport channels according to the received RB resource allocations. This conversion is performed by the MAC (DL) processing entity 404 at the base station client 11a, 12a, 13a.

In step S905, the base station client 11a converts the information on the transport channels into RF signals suitable for transmission to the UEs. The conversion is performed by the PHY processing entity 409 of the base station client 11a. The RF signals are then transmitted to the UEs by the RF unit 410 and the antenna unit 411 of the base station client 11a, 12a, 13a.

Turning to steps S906 to S913 of FIG. 9, as indicated above, these steps correspond to step S62 of FIG. 6. That is, steps S906 to S913 describe in greater detail the steps performed by the base station client 11a in the uplink.

In step S906, the base station client 11a, 12a, 13a receives the RF signals from the UEs.

In step S907, the base station client 11a, 12a, 13a converts the RF signals received from the UEs into information on transport channels. The conversion is executed by the PHY layer processing entity 409 of the base station client 11a, 12a, 13a.

In step S908, the base station client 11a, 12a, 13a converts at least some of the information on the transport channels into packet signals. The information on the transport channels being converted may include received CQI reports, ACK/NACK, RACH preambles and MAC CE information from the UEs.

In step S909, the base station client 11a, 12a, 13a transmits the packet signals obtained in step S908 to the MAC-PS processing entity 215 of the BBU 541 over the Giga-bit Ethernet Interface 401.

In step S910, the MAC (UL) processing entity 406 of the base station client 11a, 12a, 13a converts the rest of the information (that is, the rest of the information not converted in step S908) on the transport channels into information on logical channels. It is envisaged that the MAC (UL) processing entity 406 may also be responsible for scheduling of UEs in the uplink.

In step S911, the base station client 11a, 12a, 13a converts the information on the logical channels into information on radio bearers using the RLC processing entity 407 and the PDCP processing entity 408. The conversion includes: converting the information on the logical channels into PDCP SDUs; performing de-ciphering and integrity protection on the PDCP SDUs; and converting the deciphered PDCP SDUs into the corresponding information on radio bearers.

In step S912, the base station client 11a, 12a, 13a determines the information on radio bearers and transmits the information on the radio bearers as packet signals over the Giga-bit Ethernet Interface 401 to the BBU 541, 551. The information on the radio bearers may include packets received in the uplink in the user plane, and packets received in the uplink in the control plane for RRC.

In step S913, the OAM entity 402 of the base station client 11a, 12a, 13a transmits/receives OAM/control and configuration information to/from the OAM 51 at the VCP 3.

Figure 10:
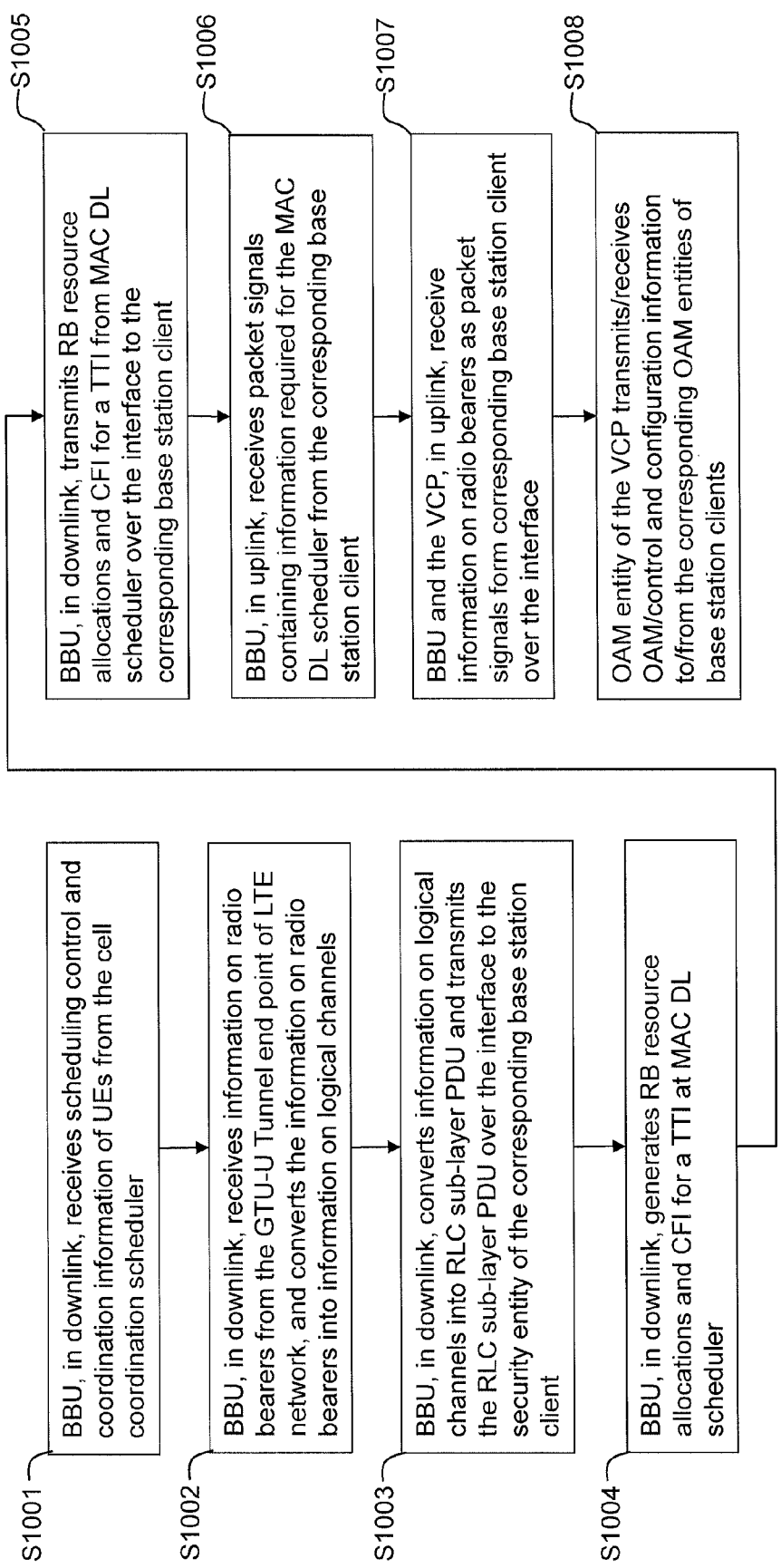
FIG. 10 is a flowchart illustrating in greater detail the steps of FIG. 7 performed by the base station server of FIG. 8.

FIG. 10 is a flowchart illustrating in greater detail the steps of the flowchart of FIG. 7 performed by the base station server 10 of the system 1, 5 of FIG. 8. More specifically, step S72 of FIG. 7 is illustrated in greater detail in steps S1002 to S1003 of FIG. 10, and step S73 of FIG. 6 is illustrated in greater detail in steps S1004 to S1005 of FIG. 10. That is, steps S1002 to S1003 describe in greater detail the steps performed the BBU 541, 551 in step S72 of FIG. 7 in the downlink, and steps S1004 to S1005 describe in greater detail the steps performed by the base station client 11a, 12a, 13a in step S73 of FIG. 7 in the uplink.

In step S1001, the BBU 541, 551 receives scheduling control and coordination information of the UEs within a cluster of cells/base station clients 11a, 12a, 13a from the cell coordination scheduler 527.

In step S1002, the PDCP processing entity 212 of the BBU 541, 551 receives information on radio bearers from a connection point at a core network, and converts the information on radio bearers into information on logical channels.

In step S1003, the RLC processing entity 213 of the BBU 541, 551 converts the information on the logical channels into one or more RLC PDUs. Then, the BBU 541 transmits the RLC PDUs over the Giga-bit Ethernet Interface 53 of the VCP 3 to the security entity 403 of the base station client 11a, 12a, 13a. As indicated above, ciphering and integrity protection on the information on the logical channels is performed by the security entity 403 of the base station client 11a, 12a, 13a.

Turning to steps S1004 to S1005 of FIG. 10, these steps correspond to step S73 of FIG. 7. That is, steps S1004 to S1005 describe in greater detail the steps performed by the base station client 11a, 12a, 13a in the uplink.

In step S1004, the MAC-PS processing entity 215 of the BBU 541, 551 generates RB resource allocations and a CFI for UEs within radio service coverage for a TTI of a preconfigured duration. It is envisaged that the MAC-PS processing entity 215 may generate RB resource allocations and a CFI based on scheduling control and coordination information of UEs generated by the cell coordination scheduler 527.

In step S1005, the BBU 541, 551 transmits the RB resource allocations and the CFI from the MAC-PS processing entity 215 over the Giga-bit Ethernet Interface 53 of the VCP 3 to the base station client 11a, 12a, 13a.

In step S1006, the BBU 541, 551 receives from the base station client 11a, 12a, 13a packet signals containing information required for the MAC (DL) processing entity 404. The information required may include some of the information on the transport channels being converted at the base station client 11a, 12a, 13a, and may include received CQI reports, ACK/NACK, RACH preambles and MAC CE information from one or more UEs.

In step S1007, the VCP 3 receives information on radio bearers as packet signals from the base station client 11a, 12a, 13a over the Giga-bit Ethernet Interface 53 of the VCP 3. More specifically, the RRC processing entity 211 of the BBU 541 receives packet signals in the control plane for RRC packets in the uplink, and the connection point at the core network receives packet signals in the user plane in the uplink via the VCP 3.

In step S1008, the OAM 51 of the VCP 3 transmits/receives OAM/control and configuration information to/from OAM entities 402 of the base station client 11a, 12a, 13a. The step S1008 may be performed simultaneously along with the previously mentioned steps S1001 to S1007.

Figure 12:
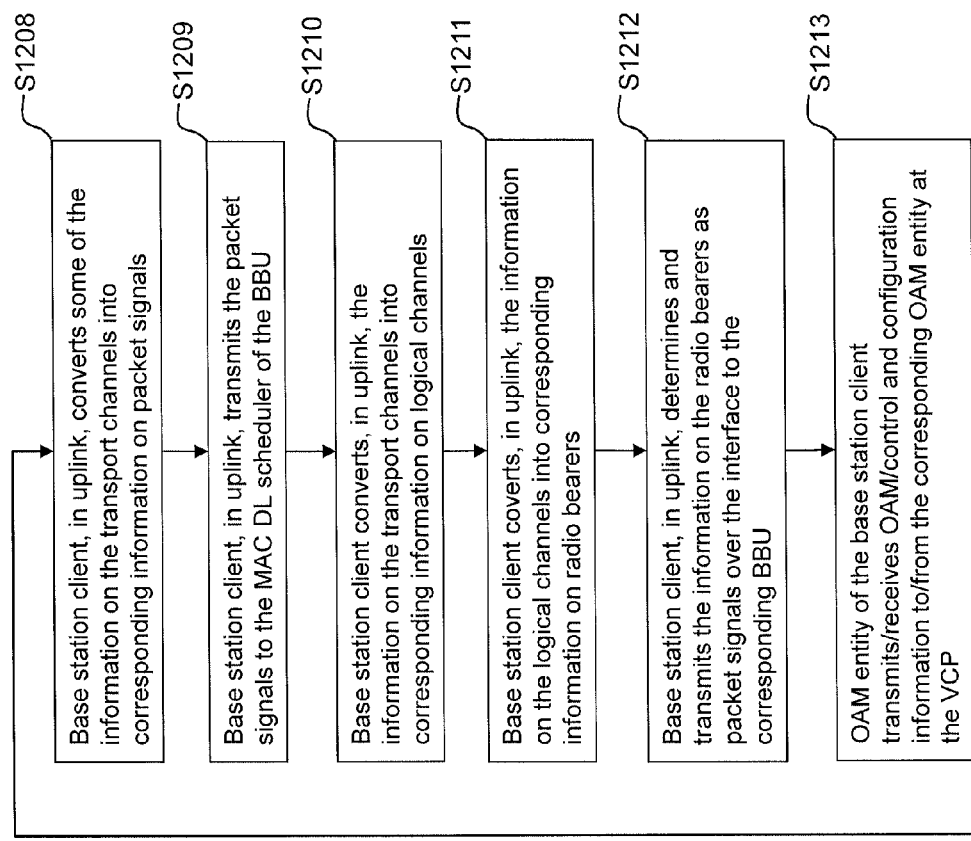
FIG. 12 is a flowchart illustrating in greater detail the steps of FIG. 6 performed by the base station client of the alternative embodiment of the system of FIG. 11.
Figure 12:
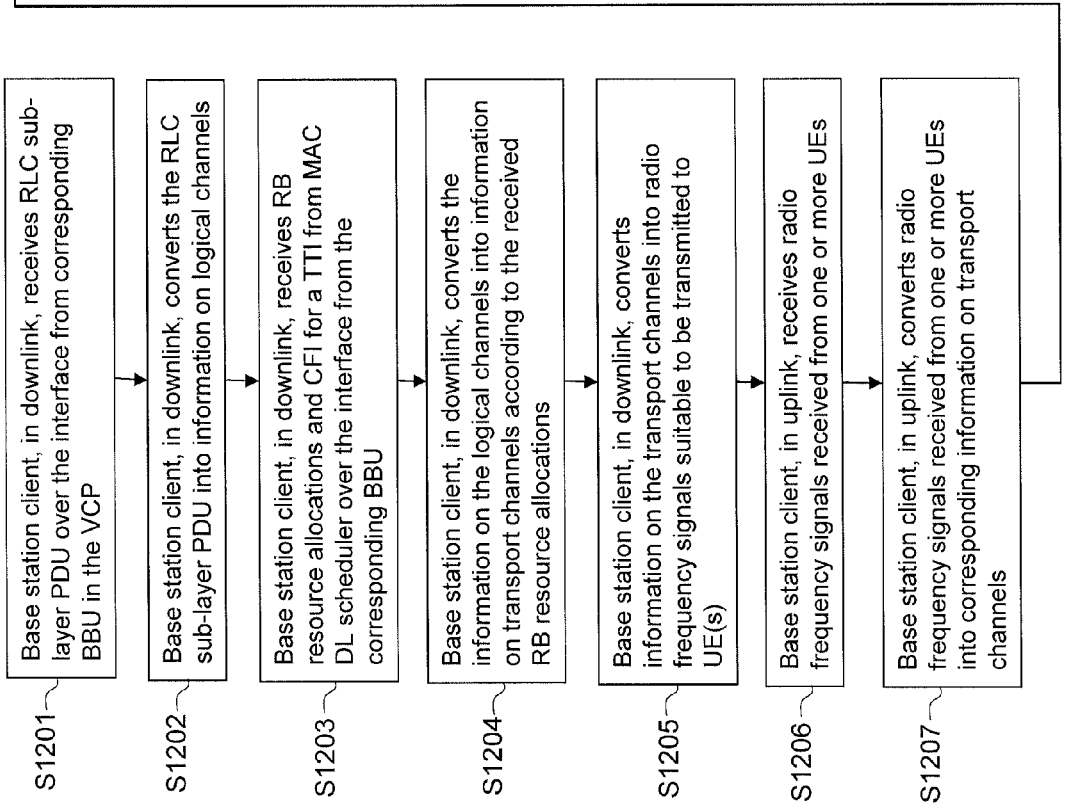

FIG. 12 is a flowchart illustrating in greater detail the steps of the flowchart of FIG. 6 performed by the base station client 115 of the alternative embodiment of the system 111 of FIG. 11. Most of the steps of FIG. 12 correspond to the steps of FIG. 9. Specifically, steps S1201 and S1203 to S1213 of FIG. 12 correspond to steps S901 and S903 to S913 of FIG. 9. The difference between FIG. 12 and FIG. 9 is that ciphering and integrity protection on PDCP SDUs encapsulated in RLC PDUs is performed by the security entity 403 of the base station client 11a, 12a, 13a in step S902 of FIG. 9, whereas ciphering and integrity protection on PDCP SDUs encapsulated in RLC PDUs is not performed by the base station client 115 in step S1202 of FIG. 12.

Figure 13:
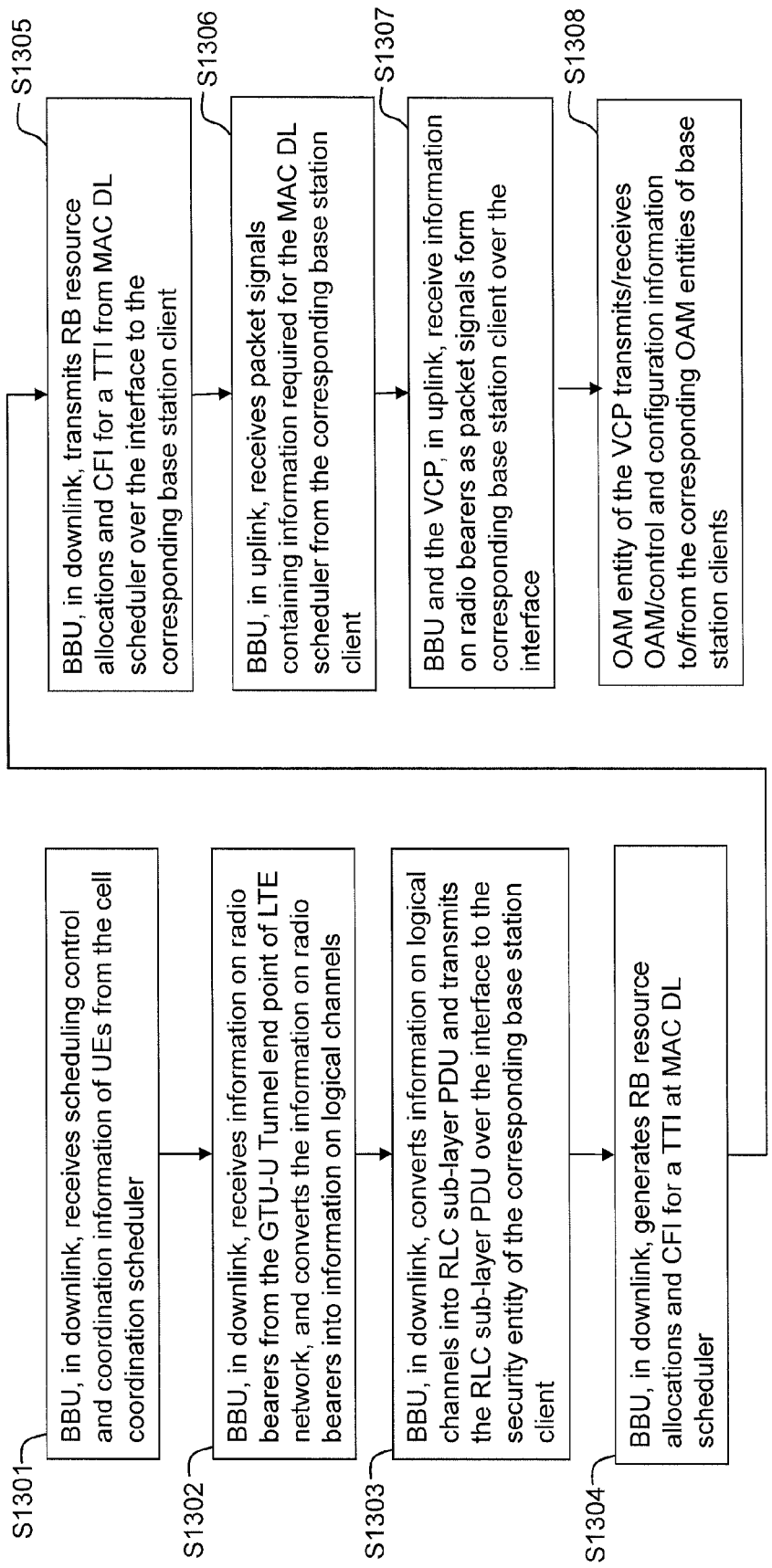
FIG. 13 is a flowchart illustrating in greater detail the steps of FIG. 7 performed by the base station server of the alternative embodiment of the system of FIG. 11.

FIG. 13 is a flowchart illustrating in greater detail the steps of the flowchart of FIG. 7 performed by the alternative embodiment of the system 111 of FIG. 11. Most of the steps of FIG. 13 correspond to the steps of FIG. 10. Specifically, steps S1301 and S1303 to S1308 of FIG. 13 correspond to steps S1001 and S1003 to S1008 of FIG. 10. The difference between FIG. 13 and FIG. 10 is that ciphering and integrity protection on PDCP SDUs encapsulated in RLC PDUs is performed by the PDCP processing entity 220 of the BBU 114 during conversion of the information on the radio bearers into the information on the logical channels in step S1302 of FIG. 13, whereas ciphering and integrity protection on PDCP SDUs encapsulated in RLC PDUs is not performed by the BBU 541, 551 in step S1002 of FIG. 10.

Potential Advantages and/or Modifications in Report of the System

As indicated above, the functional components of the system 1, 5, 111 is split between the BBU 541, 551, 114 and the base station client 11a, 115 such that processing that are more latency critical is performed by the base station client 11a, 12a, 13a, 115 (that is, at a cell site where UEs are located), rather than the BBU 541, 551, 114. Thus, when compared to a system where latency critical processing entities are centralized at a location remote from cell sites, the system 1, 5, 111 is advantageous in that it allows a reduction in data throughput requirements (that is, the required amount of data throughput) between the centralized base station server 10 and the remote base station clients 11a, 12a, 13a, 115.

Also, by centralizing some of the baseband processing performed by a conventional eNodeB at a single base station server 10, the system 1, 5, 111 advantageously allows efficient and dynamic usage of processing power which is otherwise distributed monolithically at multiple conventional eNodeBs. This may also lead to significant cost savings to eNodeB operators in terms of reduced CAPEX and OPEX due to a reduction in the number of cell sites.

Also, by performing PHY layer Digital Signal Processing (DSP) and RF processing at the base station clients 11a, 12a, 13a, 115, the system 1, 5, 111 advantageously minimizes transmissions between the base station clients 11a, 12a, 13a, 115 and the base station server 10.

When compared to a system where all baseband processing is performed at a cloud-based baseband processor, the system 1, 5, 111 is advantageous in that the data rate required between the base station server 10 and each base station client 11a, 12a, 13a, 115 may be lower because PHY layer processing is performed at the point of transmission (that is, by the RRH 45 of the base station client 11a, 12a, 13a, 115).

Assuming that some optical regeneration between the VCP 3 and base station client 11a, 12a, 13a, 115, the system 1, 5, 111 allows for a maximum cable distance of around 130 km (as PHY layer processing is performed at the point of transmission by the RRH 45). Thus, when compared to a system where all baseband processing is performed at a cloud-based baseband processor, the system 1, 5, 111 is advantageous in that it allows a significant separation range between the VCP 3 and each base station client 11a, 12a, 13a, 115.

Also, when compared to a centralized system where HARQ processing is centralized, the system 1, 5, 111 is advantageous in that HARQ processing can be efficiently performed at each base station client 11a, 12a, 13a, 115.

Also, it is envisaged that the system 1, 5, 111 meets the critical timing requirement of a sub-frame time budget of 1 millisecond, as typically required for systems conforming to the 3GPP LTE standard.

Also, it is envisaged that the system 1, 5, 111 meets the critical timing requirement of less than 5 ms for one way packet delay in an unloaded network, as typically required for systems conforming to the 3GPP LTE standard. For example, assuming that the delay for the optical fibre link between the base station server 10 and a base station client 11a, 12a, 13a, 115 takes the following into account eNodeB processing (from PDCP sub-layer to L1 layer) of 0.8 ms, transmission and reception, TTI, UE processing time of 0.8 ms, and a maximum propagation delay of 0.3 ms (assuming a 100 km cell distance), the one way delay $T_D = T_{eNodeB} + T_{TTI} + T_P + T_{UE} = 2.9$ ms, where $T_D$ denotes the one way delay, $T_{eNodeB}$ denotes the eNodeB processing time, $T_P$ denotes maximum propagation delay, and $T_{UE}$ denotes the UE processing time. Assuming that HARQ retransmissions occur every 8 ms with a probability of 10% (for a non-loaded network), the maximum delay $T_{max} = 2.9 + 0.8 = 3.7$ ms. This results in a one way delay time budget of 1.3 ms which is smaller than the required one way packet delay limitation of 5 ms. If we make the same assumptions, the maximum cable distance between the base station server 10 and a base station client 11a, 12a, 13a, 115 is 250 km which is typically sufficient for whole city coverage.

In the system 1, 5, 111, base station deployment density can be increased by increasing the number of base station clients 11a, 12a, 13a, 115 without deployment of additional base station servers 10. In addition, as the base station server 10 centralizes all of the baseband processing power, significant OPEX and CAPEX savings can be achieved and upgrades may be more easily achievable.

In the system 1, 5, 111, centralized pooling of processing resource can be exploited to provide significant benefits to operators of wireless/mobile communication networks. This may lead to cost savings, gather energy efficiency, capacity improvement and improved load balancing. For example, by housing baseband processing in one central location at the base station server 10, an operator of the system 1, 5, 111 can benefit from centralized management and operation of the radio network. The centralized management and operation of the wireless/mobile communication network may provide operation and management cost savings, and allow an operator of the system 1, 5, 111 to avoid the difficulty in finding a suitable site required for conventional eNodeBs and the continual operating expense of renting the real estate, ensuring an adequate power supply, shielding from the environment and securing the location. In addition, base station clients 11a, 12a, 13a, 115 are significantly less complex in terms of functionality, size and power requirements compared to conventional eNodeBs. Thus, expansion of the system 1, 5, 111 may be cheaper and faster.

Significant reduction in costs may be achieved because of the potential energy efficiency of the system 1, 5, 111. Centralizing baseband processing may reduce the cost of climate control and the other auxiliary site power costs conventionally required of conventional eNodeBs. In the system 1, 5, 111, small cells requiring low transmission power may be deployed. An important benefit of pooling all baseband processing in the system 1, 5, 111, is that there may be more efficient usage of resource based on load conditions. Processing resource can be allocated from areas which have lower capacity to those requiring higher capacity. For instance, the base station clients 11a, 12a, 13a, 115 can effectively be turned off overnight when there is no traffic activity within the coverage area of the base station clients 11a, 12a, 13a, 115. Additionally, the network may become more adapted to non-uniform traffic where processing load from a heavily loaded BBU 541, 551, 114 may be transferred to other under-utilized BBUs 541, 551, 114 of the base station server 10.

The centralized architecture of the system 1, 5, 111 can be exploited to improve system capacity. For example, channel status information/channel quality information may be reported by active UEs throughout cell coverage areas to the base station server 10 for utilization by cell coordination scheduler 527 to improve system capacity. For instance, when the cell coordination scheduler 527 allocates radio resource for one cell, the cell coordination scheduler 527 can take into account conditions in neighbouring cells as well as the currently serving cell. Also, the centralized architecture of the system 1, 5, 111 can be exploited to implement joint processing and scheduling to combat inter-cell interference (ICI).

Since baseband processing is centralized at the base station server 10, there is a potential for simplifying inter-eNodeB communication in the system 1, 5, 111. This allows consideration of multi-site reception and transmission techniques. Multi-site reception of a packet from a UE at multiple eNodeBs can enhance cell capacity. This may decrease the number of required retransmissions. Also, joint scheduling or beamforming techniques in the downlink may be used by the system 1, 5, 111, as BBUs 541, 551, 114 are centralized at the base station server 10.

Centralizing baseband processing at the base station server 10 allows global radio resource management (or joint radio resource management) to be implemented in the system 1, 5, 111. For instance, centralized BBUs 541, 551, 114 can more easily perform joint processing and scheduling to mitigate inter-cell interference (ICI) and thus improve spectral efficiency. It is envisaged that spectrum efficiency of UEs at cell edges can be improved using global radio resource management strategies such as Dynamic Carrier Scheduling (CS), Dynamic Packet Scheduling (PS), Inter-Cell Interference Coordination (ICIC) and Power Control. The global radio resource management may also be performed in multi-cells conditions within a number of cells consisting in a cluster in a static or semi-static way. Also, a subset of cells within a cluster can cooperate in transmission to any UE associated with the cluster (for instance, cooperative transmission to the UE), and thus implement Coordinated Multi-Point (CoMP) transmission/reception. Therefore, BBUs 541, 551, 114 at the VCP 3 can more easily resolve network dynamics, adopt flexible spectrum usage, and accommodate interference in the wireless/mobile communication network.

It will be understood to persons skilled in the art of the invention that many modifications may be made to the system 1, 5, 111 (in particular, to the base station server 10 and/or one or more of the base station clients 11a, 12a, 13a, 115) without departing from the spirit and scope of the invention.

For example, additional improvements in uplink capacity may be achieved by performing cooperative scheduling/transmission techniques in the VCP 3, the uplink of the eNodeB protocol stack can operate locally at the cell site and thus may be implemented completely in the base station client 11a, 12a, 13a, 115. The following descriptions illustrate such implementation in more details.

In the system 1, 5, 111, BBUs 541, 551, 114 can work together in a large physical baseband resource pool. Signalling, traffic data and channel state information (CSI) of active UEs can be easily shared by BBUs 541, 551, 114 within a cluster of the base station server 10. The centralized architecture of the system 1, 5, 111 can be exploited to implement joint processing and scheduling to mitigate inter-cell interference (ICI) and improve spectral efficiency. For example, as opposed to conventional systems, inter-cell interference co-ordination (ICIC) can be implemented under the C-RAN infrastructure.

The system 1, 5, 111 may implement dynamic circuit switching to improve load balance and overall operational reliability (that is, failure protection). The overall carrier resource utilization can be increased by sharing baseband processing resources of multiple base station servers 10. This sharing of resources may allow multiple users to dynamically access the air interface. Also, dynamic packet switching may be adopted to provide UEs with flexible spectrum usage, and resources may be dynamically allocated according to interference and traffic volume, to guarantee Quality of Service as well as to achieve high capacity.

In respect of the user plane, the connection point (such as a GTP-U Tunnel end point) at the core network may be implemented by the BBU 541, 551, 114 of VCP 3 for the downlink. Optionally, the connection point may be also implemented by the BBU 541, 551, 114 of the VCP 3 for the uplink. The system 1, 5, 111 can support Frequency Division Duplex (FDD) mode and Time Division Duplex (TDD) mode.

All base station clients 11a, 12a, 13a, 115 may be synchronized using Global Positioning System (GPS) clock timebase. The reference for system timing (for example, system frame number) may be at the base station clients 11a, 12a, 13a, 115. For events that occur on Single Frequency Network (SFN) boundaries, such as handover commands or system information broadcasts, the VCP 3 may maintain such time offsets to each base station client 11a, 12a, 13a, 115.

In the downlink, ROHC may be fully implemented by the BBUs 541, 551, 114 of the VCP 3. ROHC may be exploited to compress IP packet headers when it is necessary. The system 1, 5, 111 may support the option of operating with no ciphering. Disabling of integrity protection may be optional. Security operations may be implemented by the security entity 403 of the base station client 11a, 12a, 13a, 115. In the downlink, a PDCP SDU transmitted from the BBU 541, 551, 114 to the base station client 11a, 12a, 13a, 115 may remain un-ciphered until it reaches the base station client 11a, 12a, 13a, 115. Accompanying a PDCP PDU and associated with that PDCP PDU may be metadata containing the information required to encrypt and integrity protect/integrity check the PDU at a later time. The Metadata may consist of PDCP PDU lengths and offsets within RLC PDU depending on the RLC headers sizes and Length Indicators. These offsets may be kept in the metadata as the data flows through the protocol stack of an eNodeB. Segmented PDU may be taken into account in transmission across "the Split". Additionally, regarding uplink transmission on the PDCP sub-layer operations of an eNodeB, the uplink PDCP may be fully implemented by the base station client 11a, 12a, 13a, 115.

In respect of the RLC sub-layer in the downlink, RLC processing may be fully implemented in an eNodeB instance of the BBU 541, 551, 114 of the VCP 3. In the uplink, RLC processing may be fully implemented by the base station client 11a, 12a, 13a, 115.

In respect of the MAC sub-layer in the downlink, the MAC-PS processing entity 215 may be located at the BBU 541, 551, 114 of the VCP 3. The MAC-PS processing entity 215 may be responsible for scheduling the radio resources specific for one base station client 11a, 12a, 13a, 115 (or cell) among a limited number of UE per TTI. The MAC-PS processing entity 215 may operate on a TTI basis while being controlled by the cell coordination scheduler 527 of the VCP 3 and operating on a longer time basis. The cell coordination scheduler 527 may be responsible for high-level scheduling across all UEs in a cell or in a sector such that Quality of Service (QoS) and/or other metrics may be maintained for each radio bearer. On the other hand, the cell coordination scheduler 527 operates on a longer time-base compared to the MAC-PS processing entity 215 of the base station client 11a, 12a, 13a, 115 and may cover the situation where the total number of active UE per cell is greater than the number of UE capable of being scheduled by the MAC. The rest of downlink MAC sub-layer operations may be performed by the base station client 11a, 12a, 13a, 115.

The MAC (DL) processing entity 404 at the base station client 11a, 12a, 13a, 115 may additionally perform the following operations: Downlink Shared Channel (DL-SCH) data transfer (including HARQ and multiplexing in the downlink), Paging Channel (PCH) transmission, Broadcast Channel (BCH) transmission, Discontinuous Reception, and MAC Reconfiguration and MAC Reset. The MAC sub-layer may receive RLC PDU per bearer, per UE or per TTI from the RLC sub-layer. Relevant control information may be derived from the MAC (DL) processing entity 404. In order for latency to be less than 5 ms (as required by the 3GPP LTE standard), propagation time between the base station server and the base station client 11a, 12a, 13a, 115 may nominally be less than 1.3 ms. The propagation time may be more dependent in local IP routing environment which is dependent on the IP service provider network and Service Level Agreements (SLAs).

In respect of the MAC sub-layer, RB allocations per UE per TTI may be transmitted to the MAC (DL) processing entity 404 of the base station client 11a, 12a, 13a, 115. Also, CQI reports received from a UE on a Physical Uplink Shared Channel (PUSCH) or a Physical Uplink Common Control Channel (PUCCH) may be sent from the MAC (UL) processing entity 406 and the PHY layer processing entity 409 at the base station client 11a, 12a, 13a, 115 to the MAC-PS processing entity 215 of the VCP 3.

In respect of the MAC sub-layer, the MAC-PS processing entity 215 at the VCP 3 may use information from all scheduled UEs in the cell to optimize packet/radio resource scheduling for UEs taking channel conditions per UE into account. Downlink HARQ indications received from the UE may be sent from the MAC (UL) processing entity 406 and the PHY layer processing entity 409 at the base station client 11a, 12a, 13a, 115 to the MAC-PS processing entity 215 of the VCP 3. The MAC-PS processing entity 21 may use such information for any retransmissions. For example, the MAC-PS processing entity 215 may not schedule a HARQ process from a UE in a TTI unless it knows the ACK/NACK status of the previous transmission for that HARQ process for that UE.

In respect of the MAC sub-layer, Random Access preambles received from UE in the RACH procedure may be sent to the MAC-PS processing entity 215 of the VCP 3. The MAC-PS processing entity 215 of the VCP 3 may use this information to perform scheduling in respect of Random Access Response MAC messages. The interface between the MAC (UL) processing entity 406 of the base station client 11*a*, 12*a*, 13*a*, 115 and the MAC-PS processing entity 215 of the VCP 3 may support sending information about the MAC Control Elements (CE) in the MAC buffer to the MAC-PS processing entity 215. The MAC-PS processing entity 215 may use this information to perform scheduling in respect of MAC CE messages. The MAC-PS processing entity 215 may generate a CFI every TTI for transmission on the Physical CFI Channel (PCFICH).

DCI Formats 0, 1x, 2x, 3x may be supported by the system 1, 5, 111. Timing may be preserved over the base station server and the base station client 11*a*, 12*a*, 13*a*, 115 such that, for a UE or UE group identified by an Radio Network Temporary Identifier (RNTI), the DCI transmitted on the PDCCH in one TTI corresponds to the MAC Scheduling derived in the VCP 3 for the Downlink-Shared Channel (DL-SCH) TB transmitted on the Physical Downlink Shared Channel (PDSCH) in the same TTL In respect of the DL-SCH, the Common Control Channel (CCCH), Dedicated Control Channel (DCCH) and Dedicated Traffic Channel (DTCH) may be supported. The MAC (DL) processing entity 404 of the base station client 11*a*, 12*a*, 13*a*, 115 may be responsible for mapping the Broadcast Control Channel (BCCH), CCCH, DCCH and DTCH onto the downlink shared channel (DL-SCH).

In respect of the BCH, BCCH may be supported. The MAC (DL) processing entity 404 of the base station client 11*a*, 12*a*, 13*a*, 115 may be responsible for mapping the BCCH onto BCH for transmission on the Physical Broadcast Channel (PBCH).

In respect of the PCH, Paging Control Channel (PCCH) may be supported. The MAC (DL) processing entity 404 of the base station client 11*a*, 12*a*, 13*a*, 115 may be responsible for mapping the PCCH onto PCH for transmission on the PDSCH. PCH TBs are associated with DCI which in turn are associated with a Paging Radio Network Temporary Identity (P-RNTI).

In respect of the Multicast Channel (MCH), Multicast Traffic Channel (MTCH) and Multicast Control Channel (MCCH) may be supported. The MAC (DL) processing entity 404 of the base station client 11*a*, 12*a*, 13*a*, 115 may be responsible for mapping the MTCH and MCCH onto the Multicast Channel (MCH).

In respect of the uplink, the MAC-PS processing entity 215 may be implemented by the base station client 11*a*, 12*a*, 13*a*, 115. The MAC (UL) processing entity 406 of the base station client 11*a*, 12*a*, 13*a*, 115 may support the Uplink Shared Channel (UL-SCH). The MAC (DL) processing entity 404 and/or the MAC (UL) processing entity 406 of the base station client 11*a*, 12*a*, 13*a*, 115 may support RACH.

In respect of the PHY layer, the PHY layer processing entity 409 may be implemented by the base station client 11*a*, 12*a*, 13*a*, 115. The PHY layer processing entity 409 of the base station client 11*a*, 12*a*, 13*a*, 115 may support transmission of PBCH in the downlink. The PHY layer processing entity 409 of the base station client 11*a*, 12*a*, 13*a*, 115 may support transmission of PDSCH in the downlink. The PHY layer processing entity 409 of the base station client 11*a*, 12*a*, 13*a*, 115 may support reception of Physical Random Access Channel (PRACH), PUCCH and PUSCH in the uplink. The PHY layer processing entity 409 of the base station client 11*a*, 12*a*, 13*a*, 115 may support transmission of Physical Multicast Channel (PMCH) in the downlink. The CFI provided by the MAC-PS processing entity 215 of the BBU 541 may be processed by the PHY layer processing entity 409 of the base station client 11*a* onto one PCFICH for transmission in the cell. The DCI (per UE or per group of UEs provided by the MAC-PS processing entity 215 may be processed by the PHY layer processing entity 409 of the base station client 11*a*, 12*a*, 13*a*, 115 onto one PDCCH for each UE or UE group. The Physical Hybrid-ARQ Indicator Channel (PHICH) may transmit ACK/NACK based on the received UL-SCH Block Error indication per UE. The ACK/NACK may be transmitted at the correct timing according to synchronous HARQ operation in the UL.

The PHY layer processing entity 409 of the base station client 11*a*, 12*a*, 13*a*, 115 may be implemented on commercially available devices such as off-the-shelf Small Cell System on a Chip (SoC) devices. These commercially available devices may contain on-chip hardware co-processors to implement Fast Fourier Transform (FFT) or turbo-coding algorithms as well as encryption and integrity protection algorithms. The PHY layer processing entity 409 of the base station client 11*a*, 12*a*, 13*a*, 115 may cipher all Data Radio Bearer (DRBs) which may include data in the user plane and Signaling Radio Bearers (SRBs) 1 and 2 which may include control/signalling information in the control plane. The PHY layer processing entity 409 the base station client 11*a*, 12*a*, 13*a*, 115 may also perform integrity protection for control/signalling information in the control plane.

For dynamic operation, the MAC-PS processing entity 215 of the BBU 541, 551, 114 may calculate the optimum CFI per TTI such that the lowest number of symbols used is sufficient to control the instantaneous data transmission requirement for that TTI. For static operation, the MAC-PS processing entity 215 of the BBU 541, 551, 114 may set a CFI based on the number of UE contexts in the cell such that for low UE numbers, CFI=1; for medium UE numbers CFI=2; and for high UE numbers, CFI=3.

In the downlink, the DCI may consist of downlink scheduling assignments, HARQ information and power control information per UE or UE group as well as an RNTI identifying the UE or UE group. The downlink scheduling assignments may be an allocation of Radio Bearer resource which comes from the MAC (UL) processing entity 406 of the base station client. This allocation may consist of Allocation Type, RB Allocation, and Modulation Coding Scheme (MCS). The HARQ information may include: HARQ Process Number, NDI, and RV. This HARQ information may be input to the HARQ entity implemented by the base station client 11*a*, 12*a*, 13*a*, 115. For DCIO, input is required from the MAC (UL) processing entity 406 at the base station client 11*a*, 12*a*, 13*a*, 115 of the eNodeB corresponding to a Scheduling Grant given in response to a previous Scheduling Request from the UE in the uplink. The Scheduling Grant may include the RB Allocation, MCS and RV information, and may also include power control information. Additionally, the Grant may also include a CQI Request allowing aperiodic channel status request.

Further aspects of the system 1, 5, 111 will be apparent from the above description of the system 1, 5, 111. Persons skilled in the art will also appreciate that any of the methods described above could be embodied in program code. The program code could be supplied in a number of ways, for example on a tangible computer readable medium, such as a disc or a memory (for example, that could replace part of the memory unit 32 of the VCP 3 or the memory unit 42 of a base station client 11*a*) or as a data signal (for example, by transmitting it from the base station server 10).

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A system for converting between higher-layer packets and lower-layer packets, comprising:
   a downlink base station server performs a conversion of at least one downlink higher-layer packet to at least one downlink lower-layer packet; and
   an uplink base station client performs a conversion of at least one uplink lower-layer packet to at least one uplink higher-layer packet,
   wherein the downlink base station server performs the conversion of the at least one downlink higher-layer packet to the at least one downlink lower-layer packet by:
      receiving the at least one downlink higher-layer packet;
      converting the at least one downlink higher-layer packet to the at least one downlink lower-layer packet; and
      transmitting the at least one downlink lower-layer packet to a downlink base station client for transmission over a downlink channel to a downlink user device, and
   wherein the uplink base station client performs the conversion of the at least one uplink lower-layer packet to the at least one uplink higher-layer packet by:
      receiving the at least one uplink lower-layer packet over an uplink channel from an uplink user device;
      converting the at least one uplink lower-layer packet to the at least one uplink higher-layer packet; and
      transmitting the at least one uplink higher-layer packet to an uplink base station server.

2. The system as claimed in claim 1, wherein the downlink base station server is located at a first site, and the uplink base station client is located at a second site remote from the first site.

3. The system as claimed in claim 1, further comprising the uplink base station server, wherein the downlink base station server and the uplink base station server are implemented in the same device.

4. The system as claimed in claim 1, further comprising the downlink base station client, wherein the downlink base station client and the uplink base station client are implemented in the same device.

5. The system as claimed in claim 1, wherein the downlink channel is a downlink radio channel, and the uplink channel is an uplink radio channel.

6. The system as claimed in claim 1, wherein the downlink base station server is connected to a plurality of downlink base station clients.

7. The system as claimed in claim 6, wherein the downlink base station server is connected to each downlink base station client via a respective one of a plurality of downlink optical fibre links.

8. The system as claimed in claim 6, wherein the downlink base station server is connected to each downlink base station client via a respective one of a plurality of downlink Ethernet connections.

9. The system as claimed in claim 1, wherein the uplink base station client is connected to the uplink base station server via an uplink optical fibre link.

10. The system as claimed in claim 1, wherein the uplink base station client is connected to the uplink base station server via an uplink Ethernet connection.

11. The system as claimed in claim 1, wherein:
    each downlink higher-layer packet is a Service Data Unit (SDU) that conforms to the Third Generation Partnership Project (3GPP) Long Term Evolution (LTE) standard,
    each uplink higher-layer packet is a SDU that conforms to the 3GPP LTE standard,
    each downlink lower-layer packet is a Packet Data Unit (PDU) that conforms to the 3GPP LTE standard, and
    each uplink lower-layer packet is a PDU that conforms to the 3GPP LTE standard.

12. The system as claimed in claim 1, wherein each downlink higher-layer packet corresponds to an Internet Protocol (IP) packet, and each uplink higher-layer packet corresponds to an IP packet.

13. A method of converting between higher-layer packets and lower-layer packets, comprising:
    performing a conversion of at least one downlink higher-layer packet to at least one downlink lower-layer packet at a downlink base station server; and
    performing a conversion of at least one uplink lower-layer packet to at least one uplink higher-layer packet at an uplink base station client,
    wherein performing the conversion of the at least one downlink higher-layer packet to the at least one downlink lower-layer packet at the downlink base station server comprises:
       receiving the at least one downlink higher-layer packet;
       converting the at least one downlink higher-layer packet to the at least one downlink lower-layer packet; and
       transmitting the at least one downlink lower-layer packet to a downlink base station client for transmission over a downlink channel to a downlink user device, and
    wherein performing the conversion of the at least one uplink lower-layer packet to the at least one uplink higher-layer packet at the uplink base station client comprises:
       receiving the at least one uplink lower-layer over an uplink channel from an uplink user device;
       converting the at least one uplink lower-layer to the at least one uplink higher-layer packet; and
       transmitting the at least one uplink higher-layer packet to an uplink base station server.

14. The method as claimed in claim 13, wherein converting the at least one downlink higher-layer packet to the at least one downlink lower-layer packet comprises segmenting the at least one downlink higher-layer packet into a plurality of downlink lower-layer packets according to a Radio Link Control (RLC) protocol.

15. The method as claimed in claim 13, wherein converting the at least one downlink higher-layer packet to the at least one downlink lower-layer packet comprises concatenating a plurality of downlink higher-layer packets into the at least one downlink lower-layer packet according to a Radio Link Control (RLC) protocol.

16. The method as claimed in claim 13, wherein converting the at least one downlink higher-layer packet to the at least one downlink lower-layer packet comprises reassembling the at least one downlink higher-layer packet as the at least one downlink lower-layer packet according to a Radio Link Control (RLC) protocol.

17. The method as claimed in claim 13, wherein the Radio Link Control (RLC) protocol conforms to the Third Generation Partnership Project (3GPP) Long Term Evolution (LTE) standard.

18. A base station server comprising:
   at least one downlink packet transmitter, each downlink packet transmitter that:
      receives at least one downlink higher-layer packet;
      converts the at least one downlink higher-layer packet to at least one downlink lower-layer packet; and
      transmits the at least one downlink lower-layer packet to a downlink base station client for transmission over a downlink channel to a downlink user device; and
   at least one uplink packet receiver, each uplink packet receiver that:
      receives from an uplink base station client at least one uplink higher-layer packet converted by the uplink base station client from at least one uplink lower-layer packet received by the uplink base station client over an uplink channel from an uplink user device; and
      processes the at least one uplink higher-layer packet.

19. The base station server as claimed in claim 18, wherein the base station server comprises a plurality of uplink packet receivers, each uplink packet receiver being associated with a respective one of the plurality of uplink base station clients.

20. The base station server as claimed in claim 18, wherein the base station server comprises a plurality of downlink packet transmitters, each downlink packet transmitter being associated with a respective one of the plurality of downlink base station clients.

21. The base station server as claimed in claim 18, wherein the uplink packet receiver processes the at least one uplink higher-layer packet, by transmitting the at least one higher-layer packet to another one of the at least one downlink packet transmitter.

22. The base station server as claimed in claim 18, wherein the uplink packet receiver processes the at least one uplink higher-layer packet, by transmitting the at least one higher-layer packet to another base station server.

* * * * *